US012581510B2

(12) United States Patent
Park et al.

(10) Patent No.: US 12,581,510 B2
(45) Date of Patent: Mar. 17, 2026

(54) METHOD AND DEVICE FOR PERFORMING WIRELESS COMMUNICATION RELATED TO SL RESOURCES IN NR V2X

(71) Applicant: LG Electronics Inc., Seoul (KR)

(72) Inventors: Giwon Park, Seoul (KR); Seungmin Lee, Seoul (KR); Seoyoung Back, Seoul (KR)

(73) Assignee: LG Electronics Inc., Seoul (KR)

( * ) Notice: Subject to any disclaimer, the term of this patent is extended or adjusted under 35 U.S.C. 154(b) by 378 days.

(21) Appl. No.: 18/280,376

(22) PCT Filed: Feb. 10, 2023

(86) PCT No.: PCT/KR2023/001977
§ 371 (c)(1),
(2) Date: Sep. 5, 2023

(87) PCT Pub. No.: WO2023/153857
PCT Pub. Date: Aug. 17, 2023

(65) Prior Publication Data
US 2024/0389112 A1    Nov. 21, 2024

Related U.S. Application Data

(60) Provisional application No. 63/309,011, filed on Feb. 11, 2022.

(51) Int. Cl.
*H04W 72/25* (2023.01)
*H04W 4/40* (2018.01)
*H04W 72/51* (2023.01)

(52) U.S. Cl.
CPC ............. *H04W 72/25* (2023.01); *H04W 4/40* (2018.02); *H04W 72/51* (2023.01)

(58) Field of Classification Search
CPC ... H04W 4/40–48; H04W 8/22; H04W 72/02; H04W 72/12; H04W 72/20;
(Continued)

(56) References Cited

U.S. PATENT DOCUMENTS

2022/0417919 A1 * 12/2022 Shin ...................... H04W 72/40
2023/0224867 A1 * 7/2023 Wu ........................ H04L 1/1812
370/329
(Continued)

FOREIGN PATENT DOCUMENTS

WO    WO 2022/019714    1/2022

OTHER PUBLICATIONS

Huawei, HiSilicon, "Inter-UE coordination in sidelink resource allocation," 3GPP TSG RAN WG1 Meeting #107bis-e, R1-2200042, e-Meeting, Jan. 17-25, 2022, 28 pages.
(Continued)

*Primary Examiner* — Thomas R Cairns
(74) *Attorney, Agent, or Firm* — Fish & Richardson P.C.

(57) ABSTRACT

Systems and techniques in which a first device performs wireless communication. For example, the first device may receive, from a second device, an RRC message including information related to whether inter-user equipment (UE) coordination capability is supported. For example, the first device may transmit an inter-UE coordination request MAC CE to the second device, on the basis of the information related to whether the inter-UE coordination capability is supported indicating that the inter-UE coordination capability is supported.

20 Claims, 16 Drawing Sheets

(58) Field of Classification Search
     CPC ..... H04W 72/25; H04W 72/40; H04W 72/51;
                          H04W 72/512; H04W 92/18
     See application file for complete search history.

(56)                    References Cited

U.S. PATENT DOCUMENTS

| | | | | |
|---|---|---|---|---|
| 2023/0232428 | A1* | 7/2023 | Li | H04W 72/25 |
| | | | | 370/329 |
| 2023/0239955 | A1* | 7/2023 | Wu | H04W 8/22 |
| 2024/0080866 | A1* | 3/2024 | Luo | H04W 72/25 |
| 2024/0224297 | A1* | 7/2024 | Shin | H04W 76/14 |

OTHER PUBLICATIONS

Intel Corporation, "Inter-UE Coordination Solutions for Sidelink Communication," 3GPP TSG RAN WG1 #107-bis-e, R1-2200385, e-Meeting, Jan. 17-25, 2022, 47 pages.
International Search Report and Written Opinion in Appln. No. PCT/KR2023/001977, mailed on May 17, 2023, 6 pages (with English translation).
Moderator (LG Electronics), "Feature lead summary #8 for AI 8.11.1.2 Inter-UE coordination for Mode 2 enhancements," 3GPP TSG RAN WG1 Meeting #107bis-e R1-2200749, e-Meeting, Jan. 17-25, 2022, 179 pages.
NTT Docomo, Inc., "Resource allocation for reliability and latency enhancements," 3GPP TSG RAN WG1 #106bis-e, R1-2109700, e-Meeting, Oct. 11-19, 2021, 14 pages.

* cited by examiner

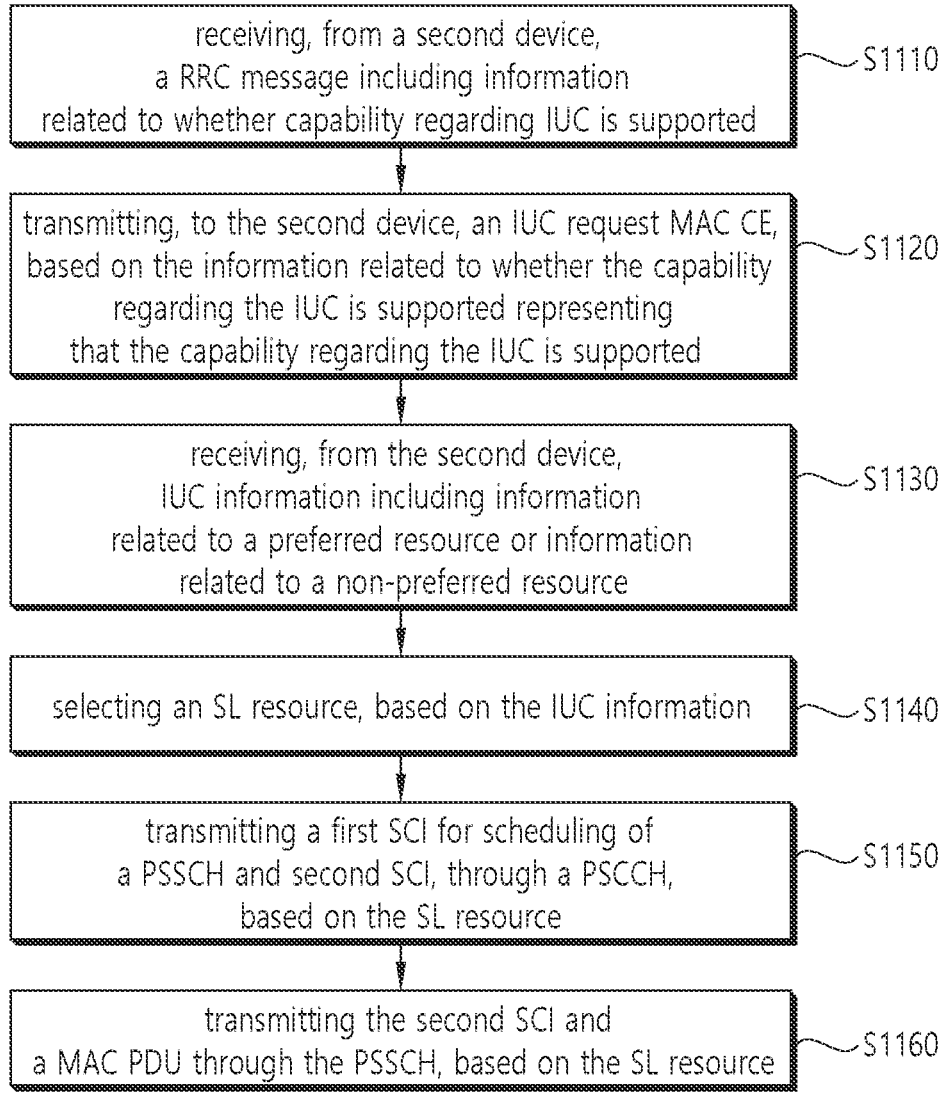

receiving, from a second device,
a RRC message including information
related to whether capability regarding IUC is supported ~S1110 transmitting, to the second device, an IUC request MAC CE,
based on the information related to whether the capability
regarding the IUC is supported representing
that the capability regarding the IUC is supported ~S1120 receiving, from the second device,
IUC information including information
related to a preferred resource or information
related to a non-preferred resource ~S1130 selecting an SL resource, based on the IUC information ~S1140 transmitting a first SCI for scheduling of
a PSSCH and second SCI, through a PSCCH,
based on the SL resource ~S1150 transmitting the second SCI and
a MAC PDU through the PSSCH, based on the SL resource ~S1160

FIG. 18

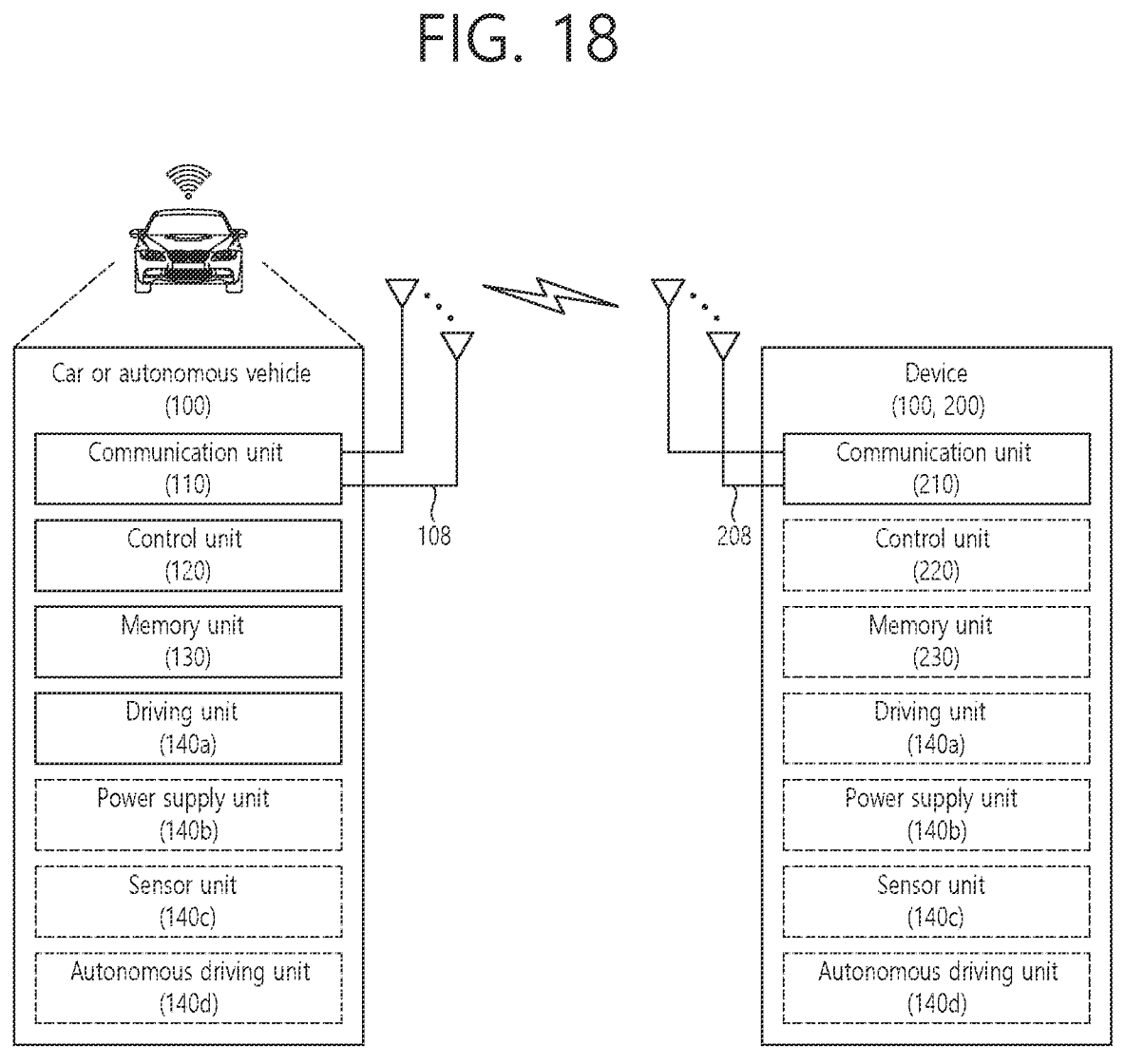

Device
(100, 200)

Communication unit
(210)

Control unit
(220)

Memory unit
(230)

Driving unit
(140a)

Power supply unit
(140b)

Sensor unit
(140c)

Autonomous driving unit
(140d)

208

Car or autonomous vehicle
(100)

Communication unit
(110)

Control unit
(120)

Memory unit
(130)

Driving unit
(140a)

Power supply unit
(140b)

Sensor unit
(140c)

Autonomous driving unit
(140d)

108

METHOD AND DEVICE FOR PERFORMING WIRELESS COMMUNICATION RELATED TO SL RESOURCES IN NR V2X

CROSS-REFERENCE TO RELATED APPLICATIONS

This application is a National Stage application under 35 U.S.C. § 371 of International Application No. PCT/KR2023/001977, filed on Feb. 10, 2023, which claims the benefit of U.S. Provisional Application No. 63/309,011, filed on Feb. 11, 2022. The disclosures of the prior applications are incorporated by reference in their entirety.

FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE DISCLOSURE

Technical Solutions

According to an embodiment of the present disclosure, a method for performing wireless communication by a first device may be proposed. For example, the first device may receive, from a second device, a radio resource control (RRC) message including information related to whether capability regarding inter-UE coordination (IUC) is supported. For example, the first device may transmit, to the second device, an IUC request medium access control (MAC) control element (CE), based on the information related to whether the capability regarding the IUC is supported representing that the capability regarding the IUC is supported. For example, the first device may receive, from the second device, IUC information including information related to a preferred resource or information related to a non-preferred resource. For example, the first device may select an SL resource, based on the IUC information. For example, the first device may transmit a first SCI for scheduling of a physical sidelink shared channel (PSSCH) and second sidelink control information (SCI), through a physical sidelink control channel (PSCCH), based on the SL resource. For example, the first device may transmit the second SCI and a medium access control (MAC) protocol data unit (PDU) through the PSSCH, based on the SL resource.

According to an embodiment of the present disclosure, a first device adapted to perform wireless communication may be proposed. For example, the first device may include one or more processors; one or more transceivers; and one or more memories connected to the one or more processors and storing instructions that, based on being executed, cause the one or more processors to perform operations. For example, the operations include at least one of: receiving, from a second device, a radio resource control (RRC) message including information related to whether capability regarding inter-UE coordination (IUC) is supported; transmitting, to the second device, an IUC request medium access control (MAC) control element (CE), based on the information related to whether the capability regarding the IUC is supported representing that the capability regarding the IUC is supported; receiving, from the second device, IUC information including information related to a preferred resource or information related to a non-preferred resource; selecting an SL resource, based on the IUC information; transmitting a first SCI for scheduling of a physical sidelink shared channel (PSSCH) and second sidelink control information (SCI), through a physical sidelink control channel (PSCCH), based on the SL resource; and/or transmitting the second SCI and a medium access control (MAC) protocol data unit (PDU) through the PSSCH, based on the SL resource.

According to an embodiment of the present disclosure, a processing device adapted to control a first device may be proposed. For example, the processing device may comprise: one or more processors; and one or more memories operably connectable to the one or more processors and storing instructions that, based on being executed, cause the one or more processors to perform operations. For example, the operations may comprise at least one of: receiving, from a second device, a radio resource control (RRC) message including information related to whether capability regarding inter-UE coordination (IUC) is supported; transmitting, to the second device, an IUC request medium access control (MAC) control element (CE), based on the information related to whether the capability regarding the IUC is supported representing that the capability regarding the IUC is supported; receiving, from the second device, IUC information including information related to a preferred resource or information related to a non-preferred resource; selecting an SL resource, based on the IUC information; transmitting a first SCI for scheduling of a physical sidelink shared channel (PSSCH) and second sidelink control information (SCI), through a physical sidelink control channel (PSCCH), based on the SL resource; and/or transmitting the second SCI and a medium access control (MAC) protocol data unit (PDU) through the PSSCH, based on the SL resource.

According to an embodiment of the present disclosure, at least one non-transitory computer-readable storage medium storing instructions may be proposed. For example, the instructions that, based on being executed by at least one processor, cause a first device to perform operations. For example, the operations may include at least one of: receiving, from a second device, a radio resource control (RRC) message including information related to whether capability regarding inter-UE coordination (IUC) is supported; transmitting, to the second device, an IUC request medium access control (MAC) control element (CE), based on the information related to whether the capability regarding the IUC is supported representing that the capability regarding the IUC is supported; receiving, from the second device, IUC information including information related to a preferred resource or information related to a non-preferred resource; selecting an SL resource, based on the IUC information; transmitting a first SCI for scheduling of a physical sidelink shared channel (PSSCH) and second sidelink control information (SCI), through a physical sidelink control channel (PSCCH), based on the SL resource; and/or transmitting the second SCI and a medium access control (MAC) protocol data unit (PDU) through the PSSCH, based on the SL resource.

According to an embodiment of the present disclosure, a method for performing wireless communication by a second device may be proposed. For example, the second device may transmit, to a first device, a radio resource control (RRC) message including information related to whether capability regarding inter-UE coordination (IUC) is supported. For example, the second device may receive, from the first device, an IUC request medium access control (MAC) control element (CE), based on the information related to whether the capability regarding the IUC is supported representing that the capability regarding the IUC is supported. For example, the second device may transmit, to the first device, IUC information including information related to a preferred resource or information related to a non-preferred resource. For example, an SL resource may be selected, based on the IUC information. For example, a first SCI for scheduling of a physical sidelink shared channel (PSSCH) and second sidelink control information (SCI) may be transmitted, through a physical sidelink control channel (PSCCH), based on the SL resource. For example, the second SCI and a medium access control (MAC) protocol data unit (PDU) may be transmitted through the PSSCH, based on the SL resource.

According to an embodiment of the present disclosure, A second device adapted to perform wireless communication may be proposed. For example, the second device may comprise: one or more processors; one or more transceivers; and one or more memories connected to the one or more processors and storing instructions that, based on being executed, cause the one or more processors to perform operations. For example, the operations may include at least one of: transmitting, to a first device, a radio resource control (RRC) message including information related to whether capability regarding inter-UE coordination (IUC) is supported; receiving, from the first device, an IUC request medium access control (MAC) control element (CE), based on the information related to whether the capability regarding the IUC is supported representing that the capability regarding the IUC is supported; and/or transmitting, to the first device, IUC information including information related to a preferred resource or information related to a non-preferred resource. For example, an SL resource may be selected, based on the IUC information. For example, a first SCI for scheduling of a physical sidelink shared channel (PSSCH) and second sidelink control information (SCI) may be transmitted, through a physical sidelink control channel (PSCCH), based on the SL resource. For example, the second SCI and a medium access control (MAC) protocol data unit (PDU) may be transmitted through the PSSCH, based on the SL resource.

According to an embodiment of the present disclosure, a processing device adapted to control a second device may be proposed. For example, the processing device may comprise: one or more processors; and one or more memories connected to the one or more processors and storing instructions that, based on being executed, cause the one or more processors to perform operations. For example, the operations may include at least one of: transmitting, to a first device, a radio resource control (RRC) message including information related to whether capability regarding inter-UE coordination (TUC) is supported; receiving, from the first device, an IUC request medium access control (MAC) control element (CE), based on the information related to whether the capability regarding the IUC is supported representing that the capability regarding the IUC is supported; and/or transmitting, to the first device, TUC information including information related to a preferred resource or information related to a non-preferred resource. For example, an SL resource may be selected, based on the IUC information. For example, a first SCI for scheduling of a physical sidelink shared channel (PSSCH) and second sidelink control information (SCI) may be transmitted, through a physical sidelink control channel (PSCCH), based on the SL resource. For example, the second SCI and a medium access control (MAC) protocol data unit (PDU) may be transmitted through the PSSCH, based on the SL resource.

According to an embodiment of the present disclosure, at least one non-transitory computer-readable storage medium storing instructions may be proposed. For example, the instructions, based on being executed by at least one processor, cause a second device to perform operations. For example, the operations may include at least one of: transmitting, to a first device, a radio resource control (RRC) message including information related to whether capability regarding inter-UE coordination (IUC) is supported; receiving, from the first device, an IUC request medium access control (MAC) control element (CE), based on the information related to whether the capability regarding the IUC is supported representing that the capability regarding the IUC is supported; and/or transmitting, to the first device, IUC information including information related to a preferred resource or information related to a non-preferred resource. For example, an SL resource may be selected, based on the IUC information. For example, a first SCI for scheduling of a physical sidelink shared channel (PSSCH) and second sidelink control information (SCI) may be transmitted, through a physical sidelink control channel (PSCCH), based on the SL resource. For example, the second SCI and a medium access control (MAC) protocol data unit (PDU) may be transmitted through the PSSCH, based on the SL resource.

BRIEF DESCRIPTION OF THE DRAWINGS

FIG. 2 shows a radio protocol architecture, based on an embodiment of the present disclosure.

FIG. 11 shows a method for a first device to perform wireless communication, according to an embodiment of the present disclosure.

FIG. 18 shows a vehicle or an autonomous vehicle, based on an embodiment of the present disclosure.

DESCRIPTION OF EXEMPLARY EMBODIMENTS

Figure 1:
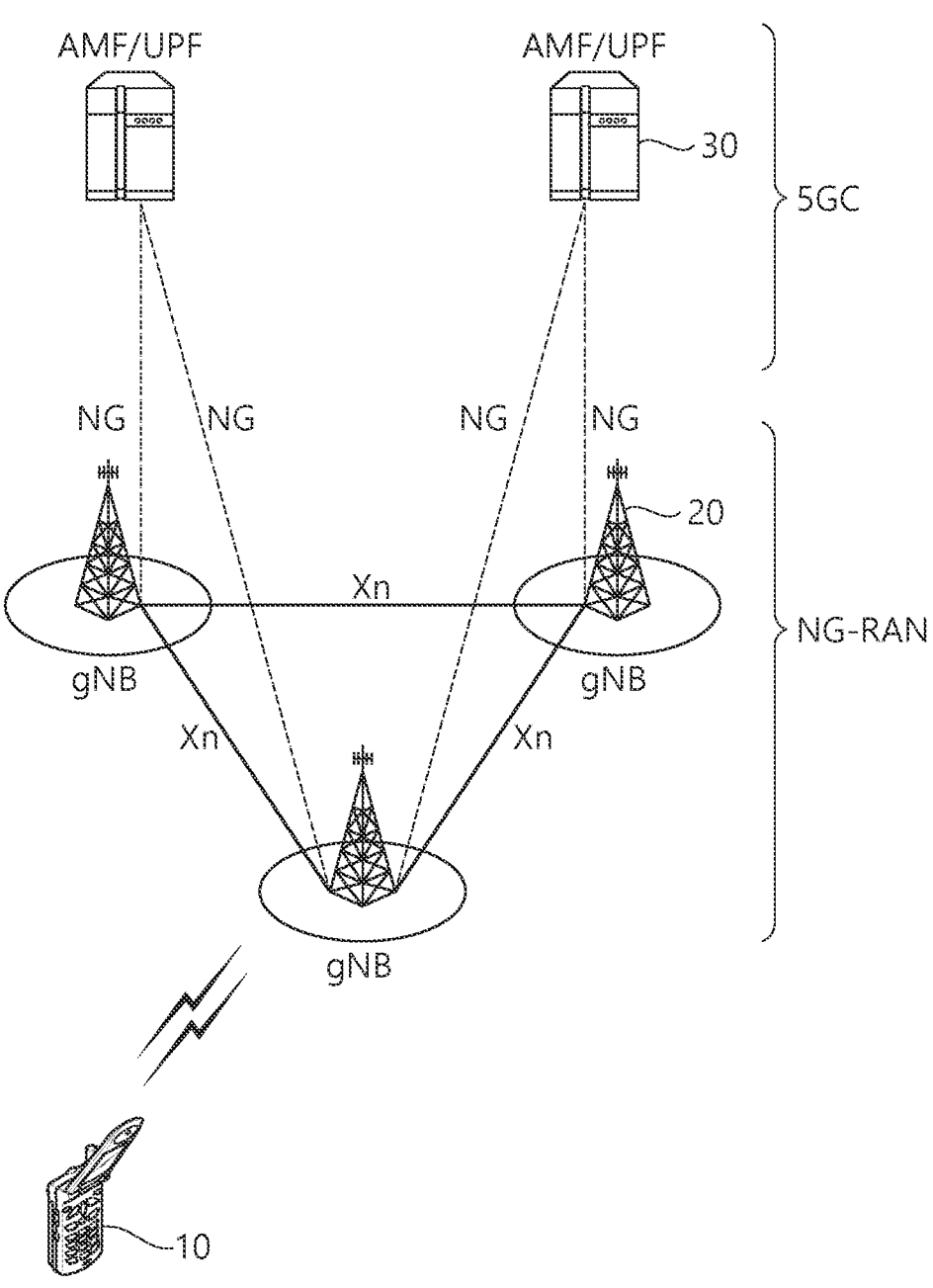
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A". "only B", or "both A and B". For example, "A, B, C" may mean "A. B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A. B, and C" may mean "only A", "only B", "only C", or "any combination of A, B, and C". In addition, "at least one of A, B, or C" or "at least one of A, B, and/or C" may mean "at least one of A. B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
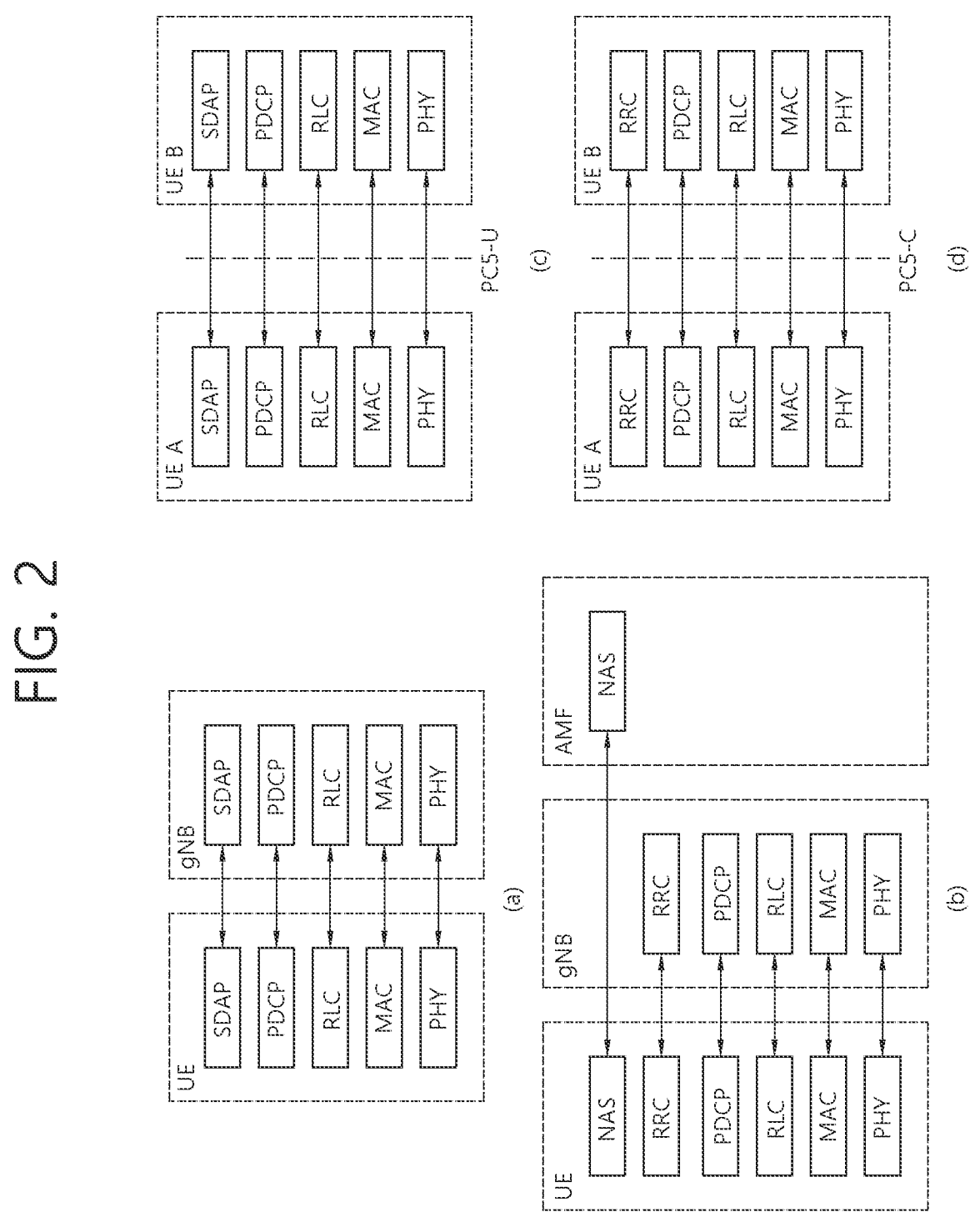

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
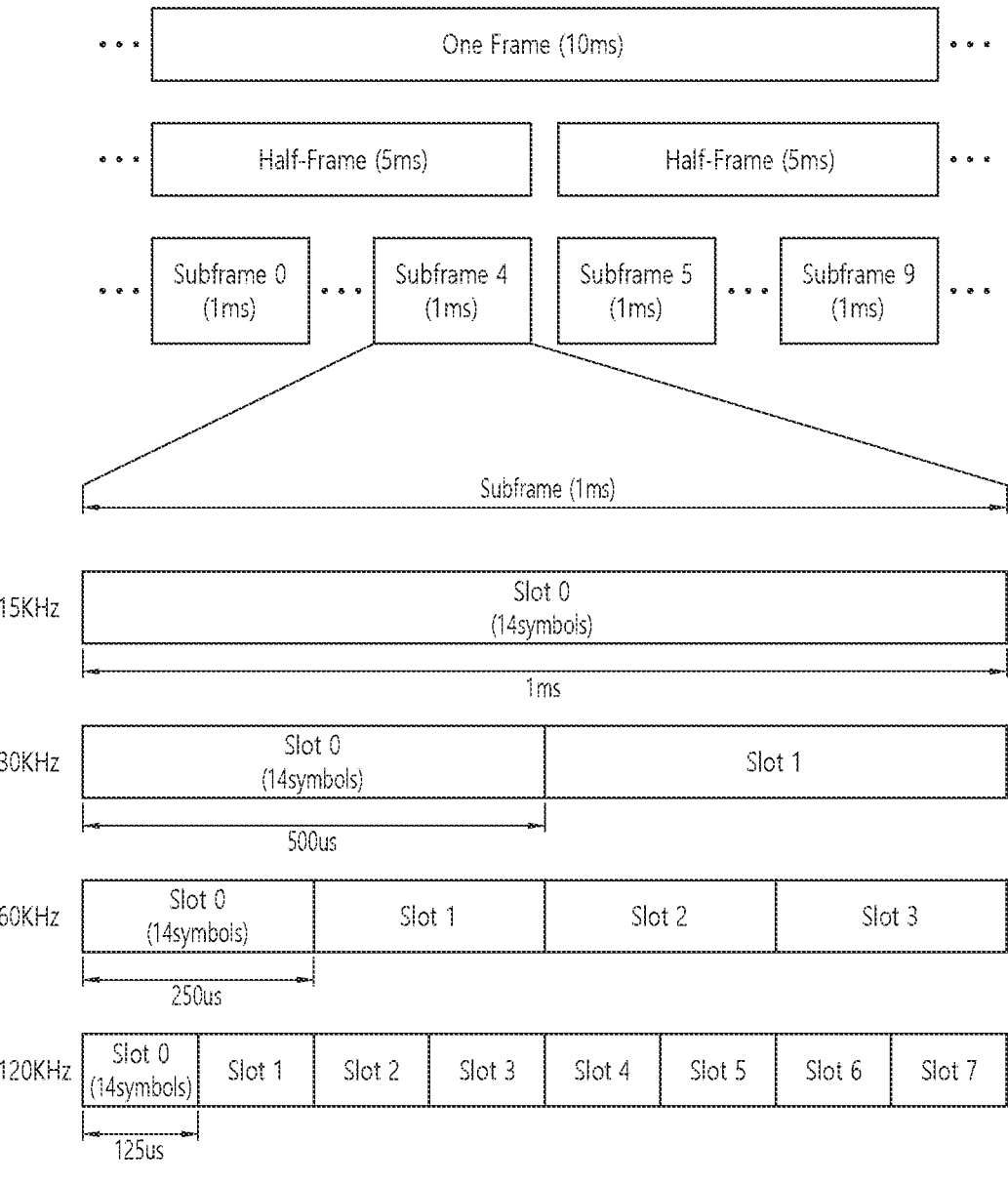
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier- FDMA (SC-FDMA) symbol (or Discrete Fourier Transform-spread-OFDM (DFT-s-OFDM) symbol).

Table 1 shown below represents an example of a number of symbols per slot (Nslotsymb), a number slots per frame (Nframe,uslot), and a number of slots per subframe (Nsubframe,uslot) based on an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range" and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz. and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120. 240 kHz |

Figure 4:
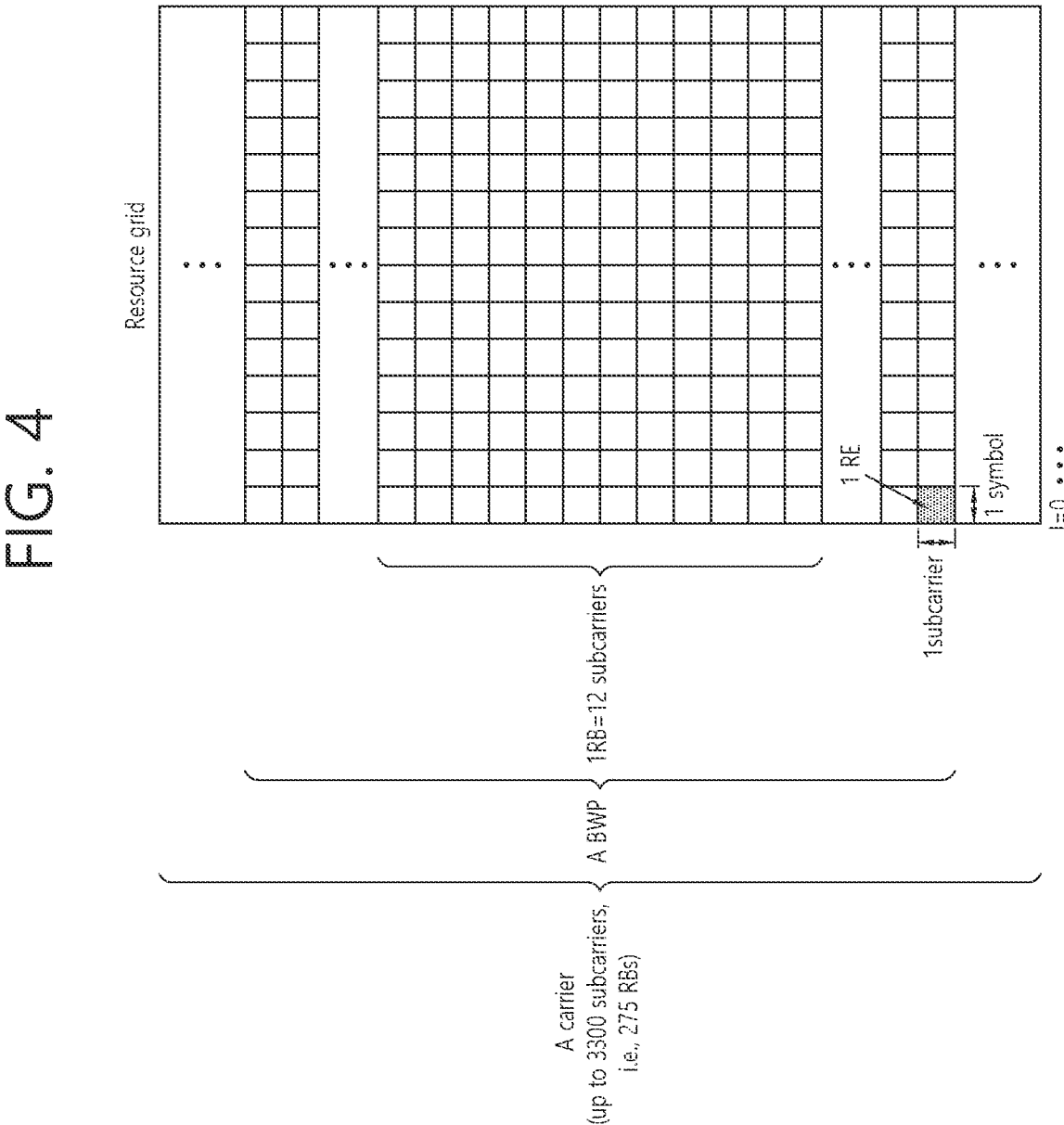
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
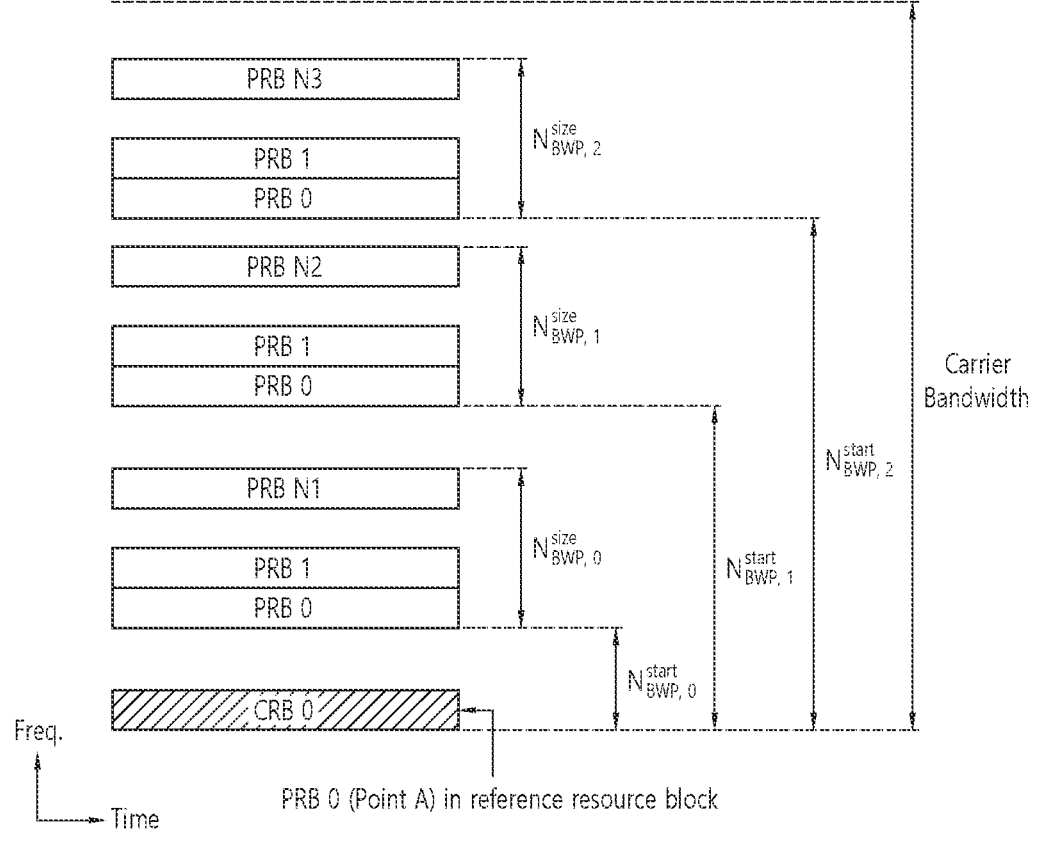
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/ physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
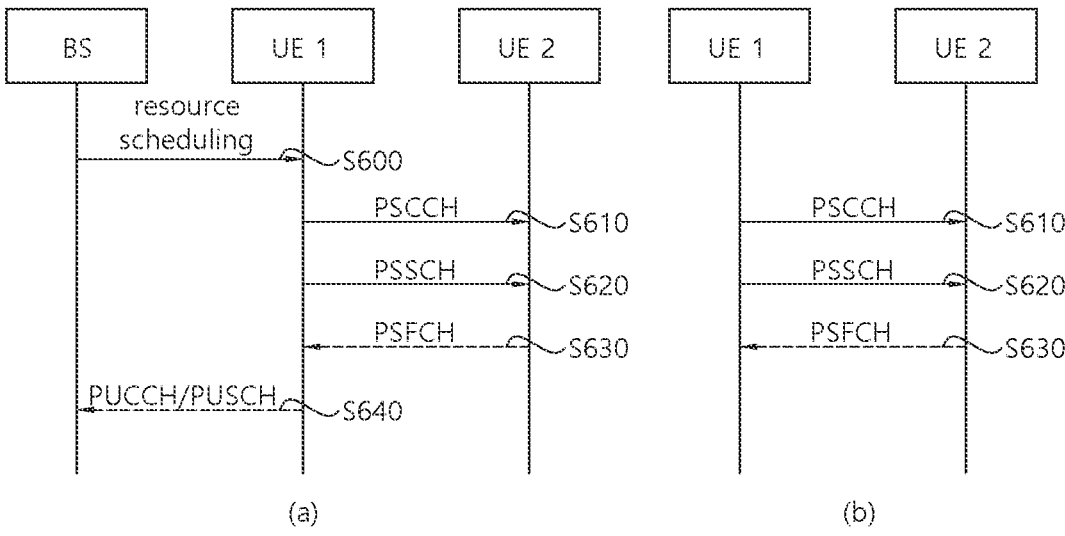
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource (s) to the first UE, and the base station may transmit a DCI related to activation or release of the CG resource(s) to the first UE.

In step S610, the first UE may transmit a PSCCH (e.g., sidelink control information (SCI) or 1$^{st}$-stage SCI) to a second UE based on the resource scheduling. In step S620, the first UE may transmit a PSSCH (e.g., 2$^{nd}$-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Hereinafter, an example of DCI format 3_0 will be described.

DCI format 3_0 is used for scheduling of NR PSCCH and NR PSSCH in one cell.

The following information is transmitted by means of the DCI format 3_0 with CRC scrambled by SL-RNTI or SL-CS-RNTI:

Resource pool index—ceiling (log 2 I) bits, where I is the number of resource pools for transmission configured by the higher layer parameter sl-TxPoolScheduling.

Time gap—3 bits determined by higher layer parameter sl-DCI-ToSL-Trans

HARQ process number—4 bits

New data indicator—1 bit

Lowest index of the subchannel allocation to the initial transmission—ceiling (log 2(NSLsubChannel)) bits SCI format 1—A fields: frequency resource assignment, time resource assignment PSFCH-to-HARQ feedback timing indicator—ceiling (log 2 Nfb_timing) bits, where Nfb_timing is the number of entries in the higher layer parameter sl-PSFCH-ToPUCCH.

PUCCH resource indicator—3 bits

Configuration index—0 bit if the UE is not configured to monitor DCI format 3_0 with CRC scrambled by SL-CS-RNTI; otherwise 3 bits. If the UE is configured to monitor DCI format 3_0 with CRC scrambled by SL-CS-RNTI, this field is reserved for DCI format 3_0 with CRC scrambled by SL-RNTI.

Counter sidelink assignment index—2 bits, 2 bits if the UE is configured with pdsch-HARQ-ACK-Codebook=dynamic, 2 bits if the UE is configured with pdsch-HARQ-ACK-Codebook=semi-static Padding bits, if required Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or $1^{st}$-stage SCI) to a second UE by using the resource(s). In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a $1^{st}$ SCI, a first SCI, a $1^{st}$-stage SCI or a $1^{st}$-stage SCI format, and a SCI transmitted through a PSSCH may be referred to as a $2^{nd}$ SCI, a second SCI, a $2^{nd}$-stage SCI or a $2^{nd}$-stage SCI format. For example, the $1^{st}$-stage SCI format may include a SCI format 1-A, and the $2^{nd}$-stage SCI format may include a SCI format 2-A and/or a SCI format 2-B.

Hereinafter, an example of SCI format 1-A will be described.

SCI format 1-A is used for the scheduling of PSSCH and 2nd-stage-SCI on PSSCH.

The following information is transmitted by means of the SCI format 1-A:

Priority—3 bits

Frequency resource assignment—ceiling $(\log_2 (N^{SL}_{subChannel}(N^{SL}_{subchannel}+1)/2))$ bits when the value of the higher layer parameter sl-MaxNumPerReserve is configured to 2; otherwise ceiling $\log_2(N^{SL}_{subChannel} (N^{SL}_{subChannel}+1)(2N^{SL}_{subChannel}+1)/6)$ bits when the value of the higher layer parameter sl-MaxNumPerReserve is configured to 3

Time resource assignment—5 bits when the value of the higher layer parameter sl-MaxNumPerReserve is configured to 2; otherwise 9 bits when the value of the higher layer parameter sl-MaxNumPerReserve is configured to 3

Resource reservation period—ceiling $(\log_2 N_{rsv\_period})$ bits, where $N_{rsv\_period}$ is the number of entries in the higher layer parameter sl-ResourceReservePeriodList, if higher layer parameter sl-MultiReserveResource is configured; 0 bit otherwise DMRS pattern—ceiling $(\log_2 N_{pattern})$ bits, where $N_{pattern}$ is the number of DMRS patterns configured by higher layer parameter sl-PSSCH-DMRS-TimePatternList $2^{nd}$-stage SCI format—2 bits as defined in Table 5

Beta_offset indicator—2 bits as provided by higher layer parameter sl-BetaOffsets2ndSCI Number of DMRS port—1 bit as defined in Table 6

Modulation and coding scheme—5 bits

Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits, with value set to zero.

TABLE 5

| Value of 2nd-stage SCI format field | 2nd-stage SCI format |
|---|---|
| 00 | SCI format 2-A |
| 01 | SCI format 2-B |

TABLE 5-continued

| Value of 2nd-stage SCI format field | 2nd-stage SCI format |
|---|---|
| 10 | Reserved |
| 11 | Reserved |

TABLE 6

| Value of the Number of DMRS port field | Antenna ports |
|---|---|
| 0 | 1000 |
| 1 | 1000 and 1001 |

Hereinafter, an example of SCI format 2-A will be described.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits
New data indicator—1 bit
Redundancy version—2 bits
Source ID—8 bits
Destination ID—16 bits
HARQ feedback enabled/disabled indicator—1 bit
Cast type indicator—2 bits as defined in Table 7
CSI request—1 bit

TABLE 7

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described.

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits
New data indicator—1 bit
Redundancy version—2 bits
Source ID—8 bits
Destination ID—16 bits
HARQ feedback enabled/disabled indicator—1 bit
Zone ID—12 bits
Communication range requirement—4 bits determined by higher layer parameter sl-ZoneConfigMCR-Index Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Figure 7:
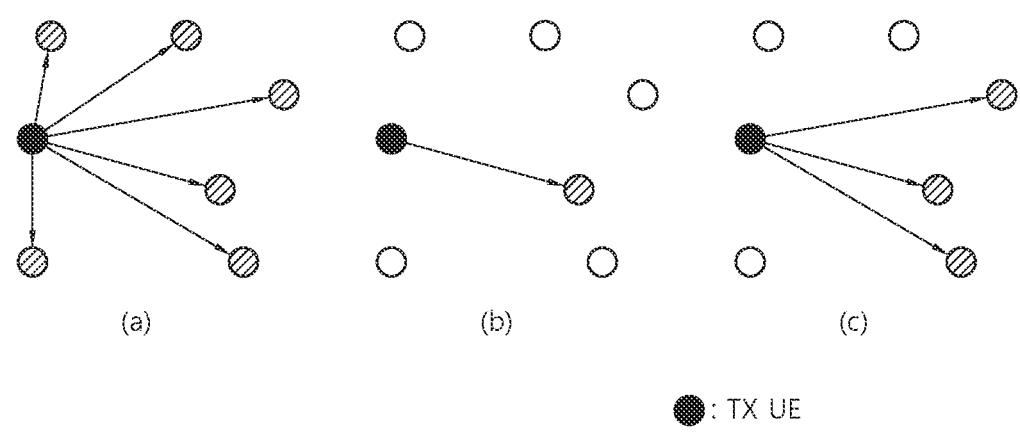
FIG. 7 shows three cast types, based on an embodiment of the present disclosure.

FIG. 7 shows three cast types, based on an embodiment of the present disclosure. The embodiment of FIG. 7 may be combined with various embodiments of the present disclosure. Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure. SL groupcast communication may be replaced with SL multicast communication, SL one-to-many communication, or the like.

Hereinafter, a hybrid automatic repeat request (HARQ) procedure will be described.

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

In the present disclosure. HARQ-ACK may be referred to as ACK, ACK information, or positive-ACK information, and HARQ-NACK may be referred to as NACK, NACK information, or negative-ACK information.

An SL DRX configuration referred to in this disclosure may include at least one or more of the following parameters.

For example, an SL DRX configuration may include one or more of the information listed below.

(1) For example, SL drx-onDurationTimer may be information on the duration at the beginning of a DRX Cycle. For example, a start period of a DRX cycle may be information on a period in which a terminal operates in an active mode to transmit or receive sidelink data.

(2) For example, SL drx-SlotOffset may be information on a delay before starting a drx-onDurationTimer of a DRX-on duration timer.

(3) For example, SL drx-InactivityTimer may be information on the duration after the PSCCH occasion in which a PSCCH indicates a new sidelink transmission and reception for the MAC entity. For example, when a transmitting terminal instructs PSSCH transmission through a PSCCH, the transmitting terminal operates in an active mode while an SL drx-InactivityTimer is running, so that the transmitting terminal may transmit PSSCH to a receiving terminal. Also, for example, when a receiving terminal is instructed that a transmitting terminal transmits a PSSCH through PSCCH reception, the receiving terminal operates in an active mode while SL drx-Inactivity Timer is running, so that the receiving terminal may receive the PSSCH from the transmitting terminal.

(4) For example, SL drx-RetransmissionTimer may be information on the maximum duration until a retransmission is received. For example, SL drx-RetransmissionTimer may be configured per HARQ process.

(5) For example, SL drx-HARQ-RTT-Timer may be information on the minimum duration before an assignment for HARQ retransmission is expected by the MAC entity. For example, SL drx-HARQ-RTT-Timer may be configured per HARQ process.

(6) For example, SL drx-LongCycleStartOffset may be information on the Long DRX cycle and drx-StartOffset which defines the subframe where the Long and Short DRX Cycle starts.

(7) For example, SL drx-ShortCycle may be information on the Short DRX cycle. For example, SL drx-ShortCycle may be optional information.

(8) For example, SL drx-ShortCycleTimer may be information on the duration a UE shall follow the Short DRX cycle. For example, SL drx-ShortCycleTimer may be optional information.

(9) For example, SL drx-StartOffset may be information about the subframe where the SL DRX cycle starts.

(10) For example, SL drx-Cycle may be information about the SL DRX cycle.

The following SL DRX timer mentioned in this disclosure may be used for the following purposes.

(1) SL DRX on-duration timer: A period in which a UE performing an SL DRX operation should basically operate in an active time to receive a counterpart UE's PSCCH/PSSCH.

(2) SL DRX inactivity timer: A period in which a UE performing an SL DRX operation extends an SL DRX on-duration period, which is a period in which an active time is basically required to receive PSCCH/PSSCH of a counterpart UE.

For example, a UE may extend an SL DRX on-duration timer by an SL DRX inactivity timer period. Also, when a UE receives a new packet (e.g., new PSSCH transmission) from a counterpart UE, the UE may start an SL DRX inactivity timer to extend the SL DRX on-duration timer.

For example, an SL DRX inactivity timer may be used to extend an SL DRX duration timer period, which is a period in which an RX UE performing an SL DRX operation should basically operate as an active time to receive a PSCCH/PSSCH of the other TX UE. That is, an SL DRX on-duration timer may be extended by an SL DRX inactivity timer period. In addition, when an RX UE receives a new packet (e.g., new PSSCH transmission) from a counterpart TX UE, the RX UE may start an SL DRX inactivity timer to extend the SL DRX on-duration timer.

(3) SL DRX HARQ RTT timer: A period in which a UE performing an SL DRX operation operates in a sleep mode until it receives a retransmission packet (or PSSCH assignment) transmitted by a counterpart UE.

For example, when a UE starts an SL DRX HARQ RTT timer, the UE may determine that a counterpart UE will not transmit a sidelink retransmission packet to it until the SL DRX HARQ RTT timer expires, and may operate in a sleep mode while the corresponding timer is running. For example, when a UE starts an SL DRX HARQ RTT timer, the UE may not monitor sidelink retransmission packets from a counterpart UE until the SL DRX HARQ RTT timer expires. For example, when an RX UE that has received a PSCCH/PSSCH transmitted by a TX UE transmits SL HARQ NACK feedback, the RX UE may start an SL DRX HARQ RTT timer. In this case, an RX UE may determine that a counterpart TX UE will not transmit a sidelink retransmission packet to it until an SL DRX HARQ RTT timer expires, and the RX UE may operate in a sleep mode while the corresponding timer is running.

(4) SL DRX retransmission timer: A timer that starts when an SL DRX HARQ RTT timer expires, and a period in which a UE performing SL DRX operation operates as an active time to receive a retransmission packet (or PSSCH assignment) transmitted by a counterpart UE.

For example, during the corresponding timer period, a UE may receive or monitor a retransmission sidelink packet (or PSSCH assignment) transmitted by a counterpart UE. For example, an RX UE may receive or monitor a retransmission sidelink packet (or PSSCH assignment) transmitted by a counterpart TX UE while an SL DRX retransmission timer is running.

The following Uu DRX timer mentioned in this disclosure may be used for the following purposes.

(1) Uu DRX HARQ RTT TimerSL

For example, Uu DRX HARQ RTT TimerSL may be used in a period in which a UE performing Uu DRX operation does not need to monitor DCI (PDCCH) for SL Mode 1 operation transmitted by a base station. That is, while a Uu DRX HARQ RTT TimerSL is running, a UE may not need to monitor a PDCCH for an SL Mode 1 operation.

(2) Uu DRX Retransmission TimerSL

For example, it may be used in a period in which a UE performing Uu DRX operation monitors DCI (PDCCH) for SL Mode 1 operation transmitted by a base station. That is, while a Uu DRX Retransmission TimerSL is running, a UE may monitor a PDCCH transmitted by a base station for an SL Mode 1 operation.

In the present disclosure, names of timers (Sidelink DRX Onduration Timer, Sidelink DRX Inactivity Timer. Sidelink DRX HARQ RTT Timer, Sidelink DRX Retransmission Timer, Uu DRX HARQ RTT TimerSL, Uu DRX Retransmission TimerSL, etc.) are exemplary, and timers that perform the same/similar functions based on content described in each timer may be regarded as the same/similar timers regardless of their names.

Meanwhile, in Release 17 NR sidelink (SL) operation. SL DRX operation will be newly supported. In the embodiment (s) of the present disclosure, an SL DRX command MAC CE operation method is proposed.

For example, in the embodiment(s) of the present disclosure, a method for transferring recommended (or preferred) transmission resource information or assistance information for transmission resource selection for a UE performing an SL DRX operation to a counterpart UE through an inter UE coordination (IUC) MAC CE is proposed.

In addition, in the embodiment (s) of the present disclosure, when UEs transmit an IUC message to perform an IUC operation in NR V2X communication, logical channel (LCH) priority of an IUC message is newly defined so that the IUC message has a different priority from other sidelink messages (PC5 RRC message, MAC CE, SL Data), and an SL logical channel prioritization (LCP) operation based on the LCH priority of the newly defined IUC message is proposed.

According to an embodiment of the present disclosure, when UE-B (SL data transmitting UE) receives an IUC MAC CE from UE-A (UE transmitting the IUC MAC CE), UE-B may select a resource for SL data transmission by referring to the received IUC MAC CE information. In addition, UE-B may request transmission of an TUC MAC from UE-A by transmitting an IUC request MAC CE requesting IUC MAC transmission. For example, upon receiving the IUC request MAC CE from UE-B, UE-A may transmit an IUC MAC CE to UE-B.

For example, in the present disclosure, an IUC MAC CE refers to a MAC CE including IUC information (e.g., including preferred/non-preferred recommendation resource information), an IUC request MAC CE may refer to a MAC CE requesting an IUC MAC CE.

1. Type of IUC MAC CE (a MAC CE including IUC information)
  1.1. Request based IUC MAC CE
  1.1.1. IUC MAC CE transmitted by UE-A as a response when UE-A receives an IUC request MAC CE from UE-B
  1.2. Condition based IUC MAC CE
  1.2.1. Not a request based IUC MAC CE, but an IUC MAC CE transmitted by UE-A when triggered, since a specific condition is met According to an embodiment of the present disclosure, a priority order of IUC messages and an LCP operation method may be provided.

In the present disclosure, the SL priority (or SL LCH priority) of an IUC message is defined as follows for an LCP operation of a MAC entity for an IUC message.

The following shows the SL priority of an IUC message. They are displayed in order of highest priority, i.e., data from SCCH may have the highest priority.

1. Data from SCCH (e.g., a PC5-S message, PC5 RRC message)
  2. SL CSI reporting MAC CE
  3. IUC MAC CE (or, the priority order of an IUC MAC CE is the same as that of an SL CSI reporting MAC CE, and may be higher than the priority order of an SL DRX command MAC CE.)
  4. IUC request MAC CE (a MAC CE transmitted for requesting an IUC MAC CE)
  5. SL DRX command MAC CE
  6. Data from any STCH (e.g., SL user data)
Or,
  1. Data from SCCH (e.g., a PC5-S message, PC5 RRC message)

2. SL CSI reporting MAC CE
  3. IUC request MAC CE
  4. IUC MAC CE
  5. SL DRX command MAC CE
  6. Data from any STCH (e.g., SL user data)
Or,
  1. Data from SCCH (e.g., a PC5-S message, PC5 RRC message)
  2. IUC MAC CE message
  3. IUC request MAC CE
  4. SL CSI reporting MAC CE
  5. SL DRX command MAC CE
  6. Data from any STCH (e.g., SL user data)
Or,
  1. Data from SCCH (e.g., a PC5-S message, PC5 RRC message)
  2. IUC request MAC CE
  3. IUC MAC CE message
  4. SL CSI reporting MAC CE
  5. SL DRX command MAC CE
  6. Data from any STCH (e.g., SL user data)
Or,
  1. Data from SCCH (e.g., a PC5-S message, PC5 RRC message)
  2. SL CSI reporting MAC CE
  3. SL DRX command MAC CE
  4. IUC MAC CE (or, the priority order of an IUC MAC CE may be the same as that of an SL DRX command MAC CE.)
  5. IUC request MAC CE
  6. Data from any STCH (e.g., SL user data)
Or,
  1. Data from SCCH (e.g., a PC5-S message, PC5 RRC message)
  2. SL CSI reporting MAC CE
  3. SL DRX command MAC CE
  4. IUC request MAC CE
  5. IUC MAC CE (or, the priority order of IUC MAC CE may be the same as STCH.)
  6. Data from any STCH (e.g., SL user data)
Or,
  1. Data from SCCH (e.g., a PC5-S message, PC5 RRC message)
  2. SL CSI reporting MAC CE
  3. SL DRX command MAC CE
  4. Data from any STCH (e.g., SL user data)
  5. IUC MAC CE
  6. IUC request MAC CE
Or,
  1. Data from SCCH (e.g., a PC5-S message, PC5 RRC message)
  2. SL CSI reporting MAC CE
  3. SL DRX command MAC CE
  4. Data from any STCH (e.g., SL user data)
  5. IUC request MAC CE
  6. IUC MAC CE
Or,
  1. IUC MAC CE
  2. TUC request MAC CE
  3. Data from SCCH (e.g., a PC5-S message, PC5 RRC message)
  4. SL CSI reporting MAC CE
  5. SL DRX command MAC CE
  6. Data from any STCH (e.g., SL user data)
Or,
  1. IUC request MAC CE 2. IUC MAC CE (Or, the priority order of IUC MAC CE may be the same as SCCH.)
3. Data from SCCH (e.g., a PC5-S message, PC5 RRC message)
4. SL CSI reporting MAC CE
5. SL DRX command MAC CE
6. Data from any STCH (e.g., SL user data)

In the present disclosure, an LCP operation may be performed as follows according to the LCH priority of an IUC message proposed above.

For example, if a MAC entity of a UE has a plurality of MAC SDUs and MAC CEs for new transmission, the MAC entity may configure a MAC PDU by selecting a MAC SDU or a MAC CE in the order of a destination having the highest LCH priority (that is, according to the descending order of the SL LCH priorities or based on the descending order of the SL LCH priorities). For example, if a MAC entity of a UE has a plurality of MAC SDUs and MAC CEs as follows, the MAC entity may perform an LCP operation (an operation of generating a MAC PDU) according to the LCH priority of the TUC MAC CE proposed in the present disclosure as follows.

Embodiment 1

For example, a MAC entity of a UE may have a plurality of MAC SDUs and MAC CEs as follows.
1. Data from SCCH (e.g., a PC5-S message, PC5 RRC message)
2. IUC MAC CE message
3. SL CSI reporting MAC CE For example, according to the SL priority (or SL LCH priority) of an IUC MAC CE message proposed in this disclosure, a MAC entity can first fill a MAC PDU with the SDU for data from the SCCH. After filling the MAC PDU with the SDU for data from the SCCH, if space remains in the MAC PDU, the MAC entity can fill the MAC PDU with the IUC MAC CE message and the SL CSI reporting MAC CE in order. If all MAC SDUs and MAC CEs (data from SCCH, TUC MAC CE message, SL CSI reporting MAC CE) are not filled in one MAC PDU, the MAC entity may fill the MAC SDU and MAC CE into the MAC PDU in the order of SL priority proposed in the present disclosure. That is, a MAC PDU can be filled as much as possible in descending order of SL priority order.

For example, in Embodiment 1 is an embodiment where the SL priority of an IUC MAC CE message is higher than an SL CSI reporting MAC CE. If a proposal where the SL priority of an SL CSI reporting MAC CE is set to be higher than an IUC MAC CE message is applied, when a MAC entity configures a MAC PDU, the MAC PDU may be generated by first including the SL CSI reporting MAC CE in the MAC PDU rather than the IUC MAC CE message.

Embodiment 2

For example, a MAC entity of a UE may have a plurality of MAC SDUs and MAC CEs as follows.
1. IUC MAC CE message
2. SL CSI reporting MAC CE
3. Data from an STCH (e.g., SL user data)

For example, according to the SL priority (or SL LCH priority) of an IUC MAC CE message proposed in the present disclosure, a MAC entity may first fill a MAC PDU with the IUC MAC CE message. If space remains in a MAC PDU after filling the MAC PDU with an IUC MAC CE message, the MAC entity may sequentially fill the MAC PDU with an SL CSI MAC CE and an MAC SDU for data from an STCH. If one MAC PDU cannot be filled with all MAC CEs and MAC SDUs (IUC MAC CE message, SL CSI reporting MAC CE, data from STCH), the MAC entity may fill the MAC PDU with the MAC CE and the MAC SDU in the order of SL priority proposed in the present disclosure.

For example, the Embodiment 2 is an embodiment where the SL priority of an IUC MAC CE message is higher than that of an SL CSI reporting MAC CE. If a proposal where the SL priority of an SL CSI reporting MAC CE is set to be higher than an IUC MAC CE message is applied, when a MAC entity configures a MAC PDU, the MAC PDU may be generated by first including the SL CSI reporting MAC CE in the MAC PDU rather than the IUC MAC CE message.

According to an embodiment of the present disclosure, if a MAC entity of a UE has multiple MAC CEs, MAC SDUs, and IUC MAC CE messages to be transmitted to destination UEs, a method of configuring a MAC PDU by the MAC entity selecting a destination SDU or a destination MAC CE having the highest LCH priority based on the SL priority (or SL LCH priority) order proposed in this disclosure has been proposed.

For example, Embodiments 1 and 2 are each only just one embodiment, a UE may perform an operation of configuring or generating a MAC PDU according to various priority sequences for an IUC MAC CE proposed in the present disclosure.

According to an embodiment of the present disclosure, the following order of priority is also proposed.

For example, the following shows the SL priority of an IUC message. They are displayed in order of highest priority, that is, data from SCCH may have the highest priority.
1. Data from SCCH (e.g., a PC5-S message, PC5 RRC message)
2. SL CSI reporting MAC CE
3. Request based IUC MAC CE (Or, the priority order of a request based IUC MAC CE may be the same as that of an SL CSI reporting MAC CE, and may be higher than that of an SL DRX command MAC CE.)
4. Condition based TUC MAC CE (Or, the priority order of a condition based IUC MAC CE may be the same as that of an SL CSI reporting MAC CE, and may be higher than that of an SL DRX command MAC CE. However, the order of priority may be lower than a request based IUC MAC CE.)
5. IUC request MAC CE (a MAC CE transmitted to request an IUC MAC CE)
6. SL DRX command MAC CE
7. Data from any STCH (e.g., SL user data)
Or,
1. Data from SCCH (e.g., a PC5-S message, PC5 RRC message)
2. SL CSI reporting MAC CE
3. IUC request MAC CE
4. Request based IUC MAC CE
5. Condition based TUC MAC CE
6. SL DRX command MAC CE
7. Data from any STCH (e.g., SL user data)
Or,
1. Data from SCCH (e.g., a PC5-S message, PC5 RRC message)
2. Request based IUC MAC CE message
3. Condition based IUC MAC CE message
4. TUC request MAC CE
5. SL CSI reporting MAC CE
6. SL DRX command MAC CE
7. Data from any STCH (e.g., SL user data)

23

Or,
1. Data from SCCH (e.g., a PC5-S message, PC5 RRC message)
2. IUC request MAC CE
3. Request based IUC MAC CE message
4. Condition based IUC MAC CE message
5. SL CSI reporting MAC CE
6. SL DRX command MAC CE
7. Data from any STCH (e.g., SL user data)
Or,
1. Data from SCCH (e.g., a PC5-S message, PC5 RRC message)
2. SL CSI reporting MAC CE
3. SL DRX command MAC CE
4. Request based IUC MAC CE (Or, the priority order of an IUC MAC CE may be the same as that of an SL DRX command MAC CE.)
5. Condition based IUC MAC CE (Or, the priority order of an IUC MAC CE may be the same as that of an SL DRX command MAC CE.)
6. IUC request MAC CE
7. Data from any STCH (e.g., SL user data)
Or,
1. Data from SCCH (e.g., a PC5-S message, PC5 RRC message)
2. SL CSI reporting MAC CE
3. SL DRX command MAC CE
4. TUC request MAC CE
5. Request based IUC MAC CE (or, the priority order of an IUC MAC CE may be the same as STCH.)
6. Condition based IUC MAC CE (or, the priority order of an IUC MAC CE may be the same as STCH.)
7. Data from any STCH (e.g., SL user data)
Or,
1. Data from SCCH (e.g., a PC5-S message, PC5 RRC message)
2. SL CSI reporting MAC CE
3. SL DRX command MAC CE
4. Data from any STCH (e.g., SL user data)
5. Request based IUC MAC CE
6. Condition based IUC MAC CE
7. IUC request MAC CE
Or,
1. Data from SCCH (e.g., a PC5-S message, PC5 RRC message)
2. SL CSI reporting MAC CE
3. SL DRX command MAC CE
4. Data from any STCH (e.g., SL user data)
5. TUC request MAC CE
6. Request based TUC MAC CE
7. Condition based IUC MAC CE
Or,
1. Request based IUC MAC CE
2. Condition based IUC MAC CE
3. IUC request MAC CE
4. Data from SCCH (e.g., a PC5-S message, PC5 RRC message)
5. SL CSI reporting MAC CE
6. SL DRX command MAC CE
7. Data from any STCH (e.g., SL user data)
Or,
1. IUC request MAC CE
2. Request based IUC MAC CE (or, the priority order of an IUC MAC CE may be the same as SCCH.)
3. Condition based IUC MAC CE (or, the priority order of an TUC MAC CE may be the same as SCCH.)

24

4. Data from SCCH (e.g., a PC5-S message, PC5 RRC message)
5. SL CSI reporting MAC CE
6. SL DRX command MAC CE
7. Data from any STCH (e.g., SL user data)

A UL/SL priority comparison (Prioritization) may be performed based on the SL priority values (or, order) of the IUC messages proposed in this disclosure. For example, the priority comparison may be an operation to determine a transmission priority when there is a UL transmission and an SL transmission pending at the UE at the same time.

According to one embodiment of the present disclosure, a destination Layer 2 ID, which is included in the MAC header upon transmission of an IUC message, is redefined as an independent L2 ID to distinguish between transmissions of IUC messages. For example, in prior art, there is a separate destination Layer 2 ID for Broadcast messages, a destination Layer 2 ID for Groupcast messages, and a destination Layer 2 ID for Unicast messages. Also, in the prior art, when multiplexing MAC PDUs, multiplexing is only supported for the same cast type, i.e., unicast can only be multiplexed with unicast, groupcast can only be multiplexed with groupcast, and broadcast can only be multiplexed with broadcast.

In the present disclosure, an independent destination L2 ID is defined for IUC messages only. In other words, according to embodiments of the present disclosure, a method is proposed to ensure that when the MAC layer performs MUX(multiplex) of MAC PDUs, only IUC messages are MUX(multiplex)ed with each other, i.e., other MAC PDUs that are not IUC messages and IUC messages are not MUX(multiplex)ed on the same MAC PDU. In addition, the independent destination L2 ID for only the IUC message may be a common destination L2 ID regardless of broadcast/groupcast/unicast (i.e., cast type). i.e., for example, a UE may perform both broadcast/groupcast/unicast based on a common destination L2 ID, i.e., the common destination L2 ID may be available for all cast types.

Alternatively, for example, an independent destination L2 ID for IUC messages only could be defined as a separate destination L2 ID for broadcast/groupcast/unicast. That is, to transmit an IUC message by unicast, a unicast destination L2 ID for the IUC message may be used, to transmit an IUC message by groupcast, a groupcast destination L2 ID for the IUC message may be used, and to transmit an IUC message by broadcast, a broadcast destination L2 ID for the IUC message may be used.

According to one embodiment of the present disclosure, a method for transmitting IUC messages using the same unicast destination L2 ID, groupcast destination L2 ID, and broadcast L2 ID used in the prior art (e.g., Release 16 NR V2X) is also proposed. When an IUC message is transmitted using a (unicast/groupcast/broadcast) destination L2 ID, the receiving UE may not be able to distinguish whether the message is an IUC message or not upon receiving the message. Therefore, it is proposed in this disclosure to add a distinguishing identifier to an SCI that indicates that the PSSCH associated with that SCI is an IUC message. For example, this allows a transmitting UE to transmit an IUC message using the same unicast destination L2 ID, groupcast destination L2 ID, and broadcast L2 ID used in the prior art (Release 16 NR V2X), but the receiving UE can receive the message and distinguish from the SCI whether the message is an IUC message.

According to one embodiment of the present disclosure, when a UE MAC entity has a plurality of MAC CEs and MAC SDUs and IUC MAC CE messages to transmit to relative destination UEs, a method may be proposed for the MAC layer to construct a MAC PDU by selecting the destination SDU or destination MAC CE with the highest LCH priority based on the SL priority (or, SL LCH priority) order proposed in the present disclosure. It may also be proposed to organize the MAC PDU by selecting the destination SDU or destination MAC CE with the highest LCH priority based on the SL priority order.

According to one embodiment of the present disclosure, the following operation(s) may be proposed as a way to prevent a UE-B from sending a useless (e.g., requesting to send IUC information) REQUEST to a MODE 1 UE, for example, in a REQUEST-BASED Inter UE Coordination (IUC) operation. According to one embodiment of the present disclosure, for example, even if UE-A receives a REQUEST from UE-B (e.g., a REQUEST requesting the transmission of IUC information), it may be determined by UE-A's implementation whether to finally feedback the IUC information. For example, the REQUEST-BASED IUC operation(s) may be limited to UNICAST. For example, according to the proposal in this disclosure, if the UE-A is in MODE 1 (e.g., even if it has IUC capability), the UE-A may report to the UE-B that it does not have IUC related capability. Alternatively, for example, the UE-A may transmit (e.g., via PC5-RRC SIGNALING) to the UE-B information regarding whether or not UE-A-role can be performed and/or status information (e.g., MODE TYPE).

For example, the operation(s) of the proposals of this disclosure may be limited to per PC5-RRC connection (or per SL unicast link, or per pair of source/destination L2 IDs, or per direction of a pair of source/destination L2 IDs, or per direction). Alternatively, for example, the operation(s) of the proposals in this disclosure may be limited to all PC5-RRC connections (or all SL unicast links, or all pairs of source/destination IDs).

Figure 8:
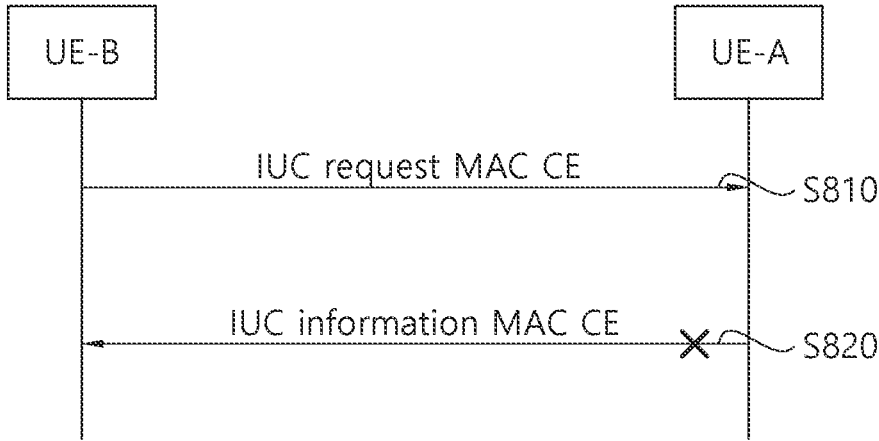
FIG. 8 is a drawing for explaining a problem of a method of performing wireless communication related to SL resources according to an embodiment of the present disclosure.

FIG. 8 is a drawing for explaining a problem of a method of performing wireless communication related to SL resources according to an embodiment of the present disclosure. The embodiment of FIG. 8 may be combined with various embodiments of the present disclosure.

Referring to FIG. 8, according to embodiment(s) of the present disclosure, IUC may be supported, for example, in sidelink resource allocation mode 2. For example, UE-A may transmit to UE-B information related to a resource (e.g., information related to a preferred resource (set) or information related to a non-preferred resource (set)) via an Inter-UE Coordination information MAC CE (hereinafter, TUC information MAC CE). Based on the information related to the resources, the UE-B may perform resource selection, for example. For example, based on the above information related to the resource and the sensing results of the UE-B, the UE-B may perform resource selection.

For example, the UE-B may transmit an IUC request MAC CE to the UE-A to request transmission of the IUC information MAC CE. For example, based on the IUC request MAC CE, the UE-A may trigger the reporting of the IUC information MAC CE. For example, based on the triggered reporting of the IUC information MAC CE, the UE-A may generate the IUC information MAC CE. For example, based on the triggered reporting of the IUC information MAC CE, UE-A may transmit the IUC information MAC CE to UE-B. For example, the IUC request MAC CE and/or the IUC information MAC CE may be transmitted based on unicast.

However, for example, the IUC operation(s) may not be supported when the UE-A is operating in resource allocation request mode 1. For example, the UE-A may be operating in resource allocation request mode 1, i.e., the UE-A may not be performing any sidelink operations with respect to resource allocation request mode 2. For example, a UE-A operating in resource allocation request mode 1 may not be able to transmit an IUC information MAC CE to a UE-B. Also, for example, UE-A may not be IUC capable. For example, the resource allocation mode of the UE-A may only support mode 1. For example, the UE-A may not be able to perform sidelink operations for resource allocation mode 2. For example, a UE-A without IUC capability may not be able to send an IUC information MAC CE to a UE-B. Therefore, for example, UE-B's IUC request MAC CE may be sent unnecessarily. For example, the transmission resources for the IUC request MAC CE may be used unnecessarily.

Figure 9:
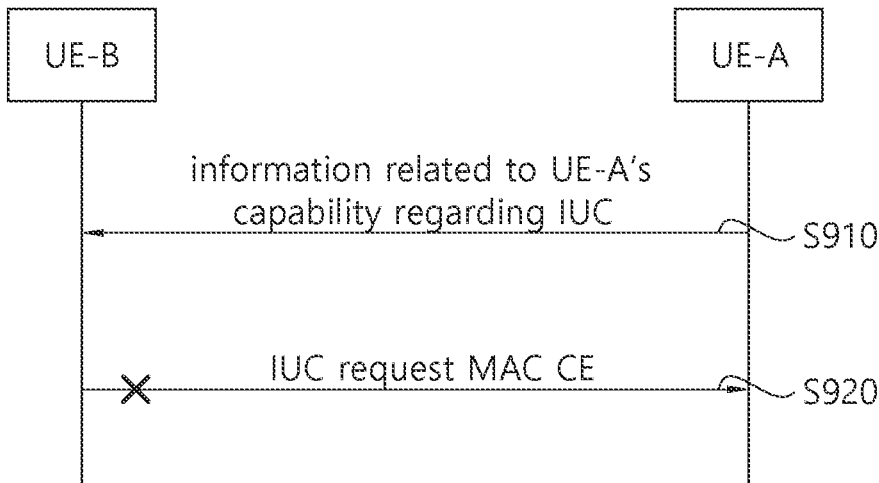
FIG. 9 is a drawing for explaining a method of performing wireless communication related to SL resources according to an embodiment of the present disclosure.

FIG. 9 is a drawing for explaining a method of performing wireless communication related to SL resources according to an embodiment of the present disclosure. The embodiment of FIG. 9 may be combined with various embodiments of the present disclosure.

Referring to FIG. 9, according to embodiment(s) of the present disclosure, for example, a UE-A may transmit information related to an IUC capability of the UE-A (e.g., information related to whether the IUC capability is supported, information representing (e.g., indicating) whether the IUC capability of the UE-A is supported, information related to a resource allocation mode type of the UE-A (e.g., a resource allocation request mode type in operation, a supported resource allocation request mode type, etc.) to a UE-B. For example, based on the information related to the IUC capability, the UE-B may determine that the UE-A does not have an TUC capability (e.g., is not supported). For example, based on the information related to the IUC capability representing (e.g., indicating) that the UE-A does not have an IUC capability (e.g., is not supported), the UE-B may not transmit the IUC request MAC CE to the UE-A (e.g., may omit the transmission).

Thus, for example, the UE-B may not transmit the IUC request MAC CE unnecessarily. For example, the transmission resources for the IUC request MAC CE may not be used unnecessarily.

Figure 10:
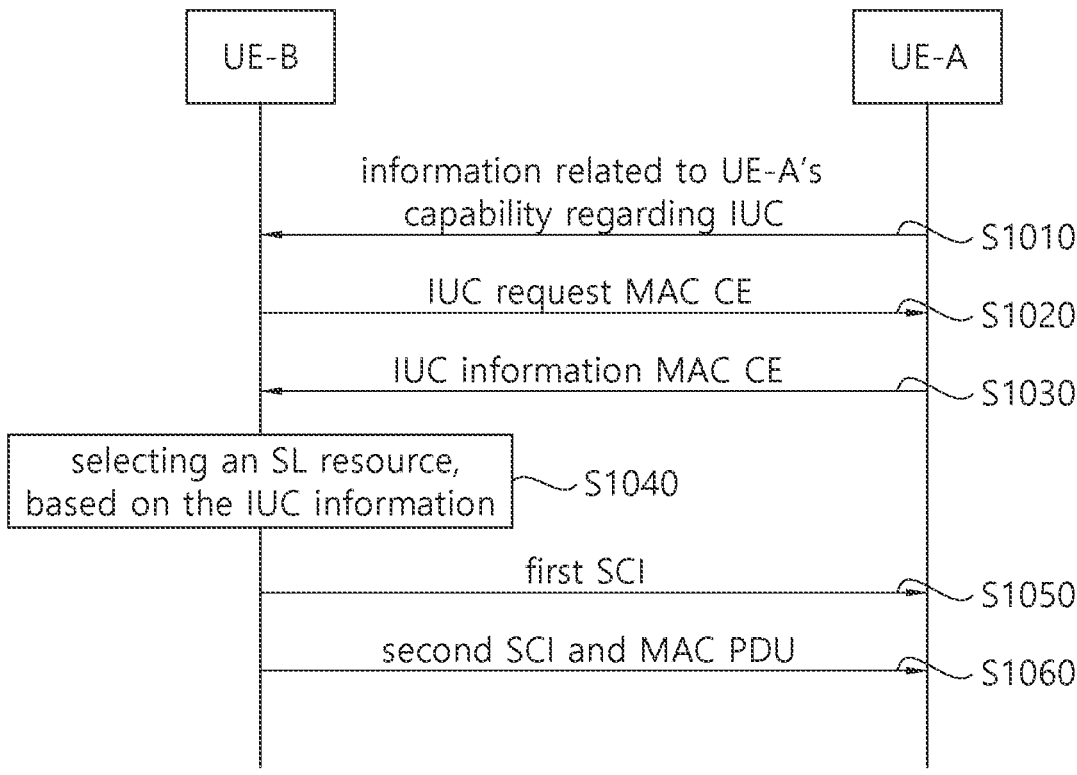
FIG. 10 is a drawing for explaining a method of performing wireless communication related to SL resources according to an embodiment of the present disclosure.

FIG. 10 is a drawing for explaining a method of performing wireless communication related to SL resources according to an embodiment of the present disclosure. The embodiment of FIG. 10 may be combined with various embodiments of the present disclosure.

Referring to FIG. 10, according to embodiment(s) of the present disclosure, in step S1010, for example, UE-A may transmit to UE-B information related to an IUC capability of UE-A (e.g., information related to whether the TUC capability is supported, information representing (e.g., indicating) that the IUC capability of UE-A is supported, information related to a resource allocation mode type of UE-A (e.g., a resource allocation request mode type in operation, a supported resource allocation request mode type), and the like).

In step S1020, based on, for example, that the IUC capability of the UE-A is supported (e.g., that the information related to the IUC capability indicates that the IUC capability is supported), the UE-B may transmit an IUC request MAC CE to the UE-A.

At step S1030, for example, based on (e.g., based on the reception of the IUC request MAC CE), reporting of IUC information by UE-A may be triggered. At step S1030, for example (e.g., based on the reception of the IUC request MAC CE), UE-A may transmit an IUC information MAC CE to UE-B.

In step S1040, for example, the UE-B may (re)select the SL resource based on the IUC information (e.g., the IUC information MAC CE).

In step S1050, for example, the UE-B may transmit a first SCI via PSCCH to the UE-A based on the (re)selected SL resource. For example, the first SCI may be an SCI for scheduling the PSSCH and the second SCI.

In step S1060, for example, UE-B may transmit a second SCI and/or a medium access control protocol data unit (MAC PDU) via PSSCH to UE-A and/or UE-C, based on the (re)selected SL resource.

Embodiments of the present disclosure may have various effects. For example, according to one embodiment of the present disclosure, by including information in an RRC message (e.g., an RRC reconfiguration message) that represents (e.g., indicates) that a request-based IUC transmission is or is not supported, unnecessary transmission of an IUC request MAC CE may be prevented. For example, according to one embodiment of the present disclosure, signaling overhead caused by unnecessary request-based TUC behavior may be reduced. For example, according to one embodiment of the present disclosure, wasting resources for unnecessarily generating IUC request MAC CEs may be prevented.

The proposal of the present disclosure can be applied and extended to a method for solving a problem in which loss occurs due to an interruption occurring during Uu BWP switching.

In addition, the proposal of the present disclosure can be applied and extended to a method to solve the problem of loss due to interruption occurring during SL BWP switching when (e.g., a plurality of) SL BWPs are supported for the UE.

The proposal of the present disclosure may be extended and applied to parameters (e.g., timers) included in UE-pair specific SL DRX configuration, UE-pair specific SL DRX pattern, or UE-pair specific SL DRX configuration, in addition to parameters (e.g. timers) included in default/common SL DRX configuration, default/common SL DRX patterns, or default/common SL DRX configuration.

In addition, an on-duration mentioned in the proposal of the present disclosure can be extended and interpreted as an active time period (e.g., time to wake-up state (e.g., RF module turned on) to receive/transmit radio signals), an off-duration may be extended and interpreted as a sleep time (e.g., a time for operating in a sleep mode state (e.g., a state in which an RF module is turned off) for power saving). It does not mean that a TX UE is obligated to operate in a sleep mode in a sleep time interval. If necessary, a TX UE may be allowed to operate in an active time for a while for a sensing operation and/or a transmission operation even in sleep time.

For example, whether the (part of) proposed method/rule of the present disclosure is applied and/or a related parameter (e.g., threshold) may be configured specifically (or differently or independently) for a resource pool. For example, whether the (part of) proposed method/rule of the present disclosure is applied and/or a related parameter (e.g., threshold) may be configured specifically (or differently or independently) for congestion level. For example, whether the (part of) proposed method/rule of the present disclosure is applied and/or a related parameter (e.g., threshold) may be configured specifically (or differently or independently) for a priority of a service. For example, whether the (part of) proposed method/rule of the present disclosure is applied and/or a related parameter (e.g., threshold) may be configured specifically (or differently or independently) for a service type. For example, whether the (part of) proposed method/rule of the present disclosure is applied and/or a related parameter (e.g., threshold) may be configured specifically (or differently or independently) for a QoS requirement (e.g., latency, reliability). For example, whether the (part of) proposed method/rule of the present disclosure is applied and/or a related parameter (e.g., threshold) may be configured specifically (or differently or independently) for PQI(5QI(5G QoS identifier) for PC5). For example, whether the (part of) proposed method/rule of the present disclosure is applied and/or a related parameter (e.g., threshold) may be configured specifically (or differently or independently) for a traffic type (e.g., a periodic generation or a aperiodic generation). For example, whether the (part of) proposed method/rule of the present disclosure is applied and/or a related parameter (e.g., threshold) may be configured specifically (or differently or independently) for an SL transmission resource allocation mode (e.g., mode 1 or mode 2).

For example, whether the proposed rule of the present disclosure is applied and/or related parameter setting values may be configured specifically (or differently or independently) for a resource pool. For example, whether the proposed rule of the present disclosure is applied and/or related parameter setting values may be configured specifically (or differently or independently) for a type of service/packet. For example, whether the proposed rule of the present disclosure is applied and/or related parameter setting values may be configured specifically (or differently or independently) for a priority of service/packet. For example, whether the proposed rule of the present disclosure is applied and/or related parameter setting values may be configured specifically (or differently or independently) for QoS requirements (e.g., URLLC/EMBB traffic, reliability, latency). For example, whether the proposed rule of the present disclosure is applied and/or related parameter setting values may be configured specifically (or differently or independently) for PQI. For example, whether the proposed rule of the present disclosure is applied and/or related parameter setting values may be configured specifically (or differently or independently) for a cast type (e.g., unicast, groupcast, broadcast). For example, whether the proposed rule of the present disclosure is applied and/or related parameter setting values may be configured specifically (or differently or independently) for (resource pool) congestion level (e.g., CBR). For example, whether the proposed rule of the present disclosure is applied and/or related parameter setting values may be configured specifically (or differently or independently) for SL HARQ feedback scheme (e.g., NACK-only feedback, ACK/NACK feedback). For example, whether the proposed rule of the present disclosure is applied and/or related parameter setting values may be configured specifically (or differently or independently) for HARQ Feedback Enabled MAC PDU transmission. For example, whether the proposed rule of the present disclosure is applied and/or related parameter setting values may be configured specifically (or differently or independently) for HARQ Feedback Disabled MAC PDU transmission. For example, whether the proposed rule of the present disclosure is applied and/or related parameter setting values may be configured specifically (or differently or independently) for whether PUCCH-based SL HARQ feedback reporting operation is set. For example, whether the proposed rule of the present disclosure is applied and/or related parameter setting values may be configured specifically (or differently or independently) for a resource reselection based on pre-emption or pre-emption. For example, whether the proposed rule of the present disclosure is applied and/or related parameter setting values may be configured specifically (or differently or independently) for a re-evaluation or re-selection of resources based on re-evaluation.

For example, whether the proposed rule of the present disclosure is applied and/or related parameter setting values may be configured specifically (or differently or independently) for (L2 or L1) (source and/or destination) identifier. For example, whether the proposed rule of the present disclosure is applied and/or related parameter setting values may be configured specifically (or differently or independently) for (L2 or L1) (Combination of Source ID and Destination ID) Identifier. For example, whether the proposed rule of the present disclosure is applied and/or related parameter setting values may be configured specifically (or differently or independently) for (L2 or L1) (a combination of source ID and destination ID pair and cast type) identifier. For example, whether the proposed rule of the present disclosure is applied and/or related parameter setting values may be configured specifically (or differently or independently) for the direction of a pair of source layer ID and destination layer ID. For example, whether the proposed rule of the present disclosure is applied and/or related parameter setting values may be configured specifically (or differently or independently) for PC5 RRC connection/link. For example, whether the proposed rule of the present disclosure is applied and/or related parameter setting values may be configured specifically (or differently or independently) for the case of performing SL DRX. For example, whether the proposed rule of the present disclosure is applied and/or related parameter setting values may be configured specifically (or differently or independently) for SL mode type (e.g., resource allocation mode 1 or resource allocation mode 2). For example, whether the proposed rule of the present disclosure is applied and/or related parameter setting values may be configured specifically (or differently or independently) for a case of performing (a)periodic resource reservation.

The certain time referred to in the proposal of the present disclosure may refer to a time during which a UE operates as an active time for a predefined time in order to receive a sidelink signal or sidelink data from a counterpart UE. A certain time referred to in the proposal of the present disclosure may refer to a time during which a UE operates as an active time for a specific timer (e.g., a sidelink DRX retransmission timer, a sidelink DRX inactivity timer, or a timer that guarantees operation as active time in DRX operation of an RX UE) time in order to receive a sidelink signal or sidelink data from a counterpart UE.

In addition, whether the proposal and proposal rule of the present disclosure are applied (and/or related parameter setting values) may also be applied to mmWave SL operation.

FIG. 11 shows a method for a first device to perform wireless communication, according to an embodiment of the present disclosure. The embodiment of FIG. 11 may be combined with various embodiments of the present disclosure.

Referring to FIG. 11, in step S1110, for example, the first device may receive, from a second device, a radio resource control (RRC) message including information related to whether capability regarding inter-UE coordination (IUC) is supported. In step S1120, For example, the first device may transmit, to the second device, an IUC request medium access control (MAC) control element (CE), based on the information related to whether the capability regarding the IUC is supported representing that the capability regarding the TUC is supported. In step S1130, For example, the first device may receive, from the second device, IUC information including information related to a preferred resource or information related to a non-preferred resource. In step S1140, For example, the first device may select an SL resource, based on the IUC information. In step S1150, For example, the first device may transmit a first SCI for scheduling of a physical sidelink shared channel (PSSCH) and second sidelink control information (SCI), through a physical sidelink control channel (PSCCH), based on the SL resource. In step S1160, For example, the first device may transmit the second SCI and a medium access control (MAC) protocol data unit (PDU) through the PSSCH, based on the SL resource.

Additionally or alternatively, the IUC information may be transmitted via the IUC information MAC CE.

Additionally or alternatively, transmission of the IUC request MAC CE may be omitted, based on the information related to whether the capability regarding the IUC is supported representing that the capability regarding the IUC is not supported.

Additionally or alternatively, the IUC information may be received from the second device via unicast between the first device and the second device.

Additionally or alternatively, the first device may perform sensing.

Additionally or alternatively, based on a result of the sensing and the IUC information, the SL resource may be selected.

Additionally or alternatively, the information related to whether the capability regarding the IUC is supported may comprise information related to SL resource allocation.

Additionally or alternatively, the SL resource allocation may comprise an SL resource allocation based on an SL resource being determined within a SL resource pool.

Additionally or alternatively, the SL resource allocation may be supported by the second device, and the SL resource may be selected based on the IUC information.

Additionally or alternatively, the SL resource allocation may comprise an SL resource allocation based on the SL resource being provided by the base station.

Additionally or alternatively, the SL resource allocation may be not supported by the second device, and the SL resource may be selected based on the IUC information.

Additionally or alternatively, the IUC request MAC CE may include information that triggers reporting of the IUC information.

Additionally or alternatively, the IUC information may be received from the second device, based on the IUC request MAC CE being transmitted to the second device.

Additionally or alternatively, the first device may select a transmission resource for the TUC request MAC CE.

The proposed method may be applied to an apparatus according to various embodiments of the present disclosure. First, one or more memories 104 of the first device 100, based on being executed by the one or more processors 102, may store instructions to cause the first device (e.g., one or more processors 102, one or more transceiver 106) to perform operations. For example, the operations may include: receiving, from a second device, a radio resource control (RRC) message including information related to whether capability regarding inter-UE coordination (IUC) is supported. For example, the operations may include: transmitting, to the second device, an TUC request medium access control (MAC) control element (CE), based on the information related to whether the capability regarding the IUC is supported representing that the capability regarding the IUC is supported, For example, the operations may include: receiving, from the second device, IUC information including information related to a preferred resource or information related to a non-preferred resource. For example, the operations may include: selecting an SL resource, based on the IUC information. For example, the operations may include: transmitting a first SCI for scheduling of a physical sidelink shared channel (PSSCH) and second sidelink control information (SCI), through a physical sidelink control channel (PSCCH), based on the SL resource. For example, the operations may include: transmitting the second SCI and a medium access control (MAC) protocol data unit (PDU) through the PSSCH, based on the SL resource.

According to an embodiment of the present disclosure, a first device adapted to perform wireless communication may be proposed. For example, the first device may include one or more processors; one or more transceivers; and one or more memories connected to the one or more processors and storing instructions that, based on being executed, cause the one or more processors to perform operations. For example, the operations include at least one of: receiving, from a second device, a radio resource control (RRC) message including information related to whether capability regarding inter-UE coordination (IUC) is supported; transmitting, to the second device, an IUC request medium access control (MAC) control element (CE), based on the information related to whether the capability regarding the IUC is supported representing that the capability regarding the IUC is supported; receiving, from the second device, IUC information including information related to a preferred resource or information related to a non-preferred resource; selecting an SL resource, based on the IUC information; transmitting a first SCI for scheduling of a physical sidelink shared channel (PSSCH) and second sidelink control information (SCI), through a physical sidelink control channel (PSCCH), based on the SL resource; and/or transmitting the second SCI and a medium access control (MAC) protocol data unit (PDU) through the PSSCH, based on the SL resource.

According to an embodiment of the present disclosure, a processing device adapted to control a first device may be proposed. For example, the processing device may comprise: one or more processors; and one or more memories operably connectable to the one or more processors and storing instructions that, based on being executed, cause the one or more processors to perform operations. For example, the operations may comprise at least one of: receiving, from a second device, a radio resource control (RRC) message including information related to whether capability regarding inter-UE coordination (IUC) is supported; transmitting, to the second device, an IUC request medium access control (MAC) control element (CE), based on the information related to whether the capability regarding the IUC is supported representing that the capability regarding the IUC is supported; receiving, from the second device, IUC information including information related to a preferred resource or information related to a non-preferred resource; selecting an SL resource, based on the IUC information; transmitting a first SCI for scheduling of a physical sidelink shared channel (PSSCH) and second sidelink control information (SCI), through a physical sidelink control channel (PSCCH), based on the SL resource; and/or transmitting the second SCI and a medium access control (MAC) protocol data unit (PDU) through the PSSCH, based on the SL resource.

According to an embodiment of the present disclosure, at least one non-transitory computer-readable storage medium storing instructions may be proposed. For example, the instructions that, based on being executed by at least one processor, cause a first device to perform operations. For example, the operations may include at least one of: receiving, from a second device, a radio resource control (RRC) message including information related to whether capability regarding inter-UE coordination (IUC) is supported; transmitting, to the second device, an IUC request medium access control (MAC) control element (CE), based on the information related to whether the capability regarding the IUC is supported representing that the capability regarding the IUC is supported; receiving, from the second device, IUC information including information related to a preferred resource or information related to a non-preferred resource; selecting an SL resource, based on the IUC information; transmitting a first SCI for scheduling of a physical sidelink shared channel (PSSCH) and second sidelink control information (SCI), through a physical sidelink control channel (PSCCH), based on the SL resource; and/or transmitting the second SCI and a medium access control (MAC) protocol data unit (PDU) through the PSSCH, based on the SL resource.

Figure 12:
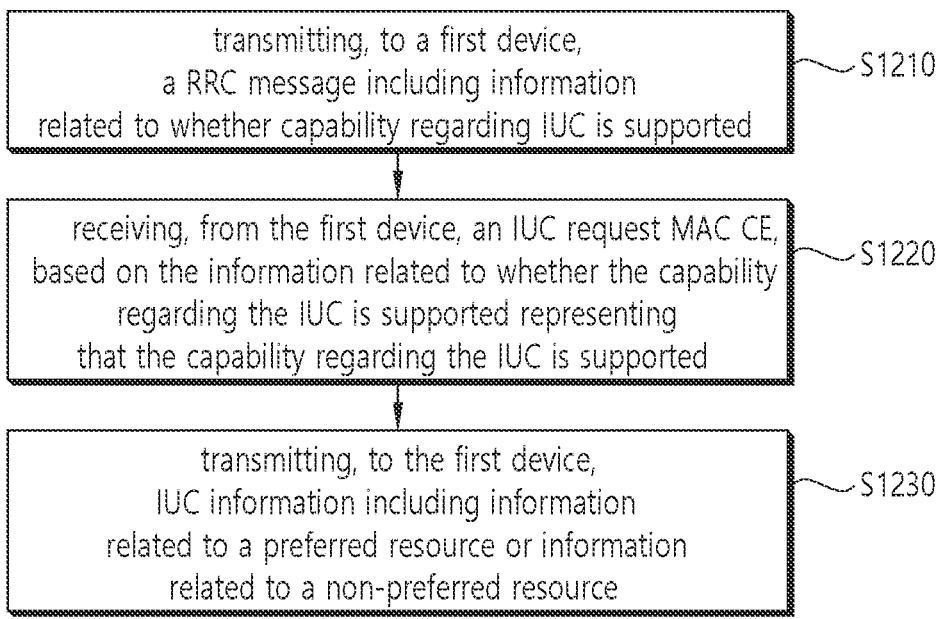
FIG. 12 shows a method for a second device to perform wireless communication according to an embodiment of the present disclosure.

FIG. 12 shows a method for a second device to perform wireless communication according to an embodiment of the present disclosure. The embodiment of FIG. 12 may be combined with various embodiments of the present disclosure.

Referring to FIG. 12, in step S1210, for example, the second device may transmit, to a first device, a radio resource control (RRC) message including information related to whether capability regarding inter-UE coordination (IUC) is supported. In step S1220, for example, the second device may receive, from the first device, an IUC request medium access control (MAC) control element (CE), based on the information related to whether the capability regarding the IUC is supported representing that the capability regarding the IUC is supported. In step S1230, for example, the second device may transmit, to the first device, IUC information including information related to a preferred resource or information related to a non-preferred resource. For example, an SL resource may be selected, based on the IUC information. For example, a first SCI for scheduling of a physical sidelink shared channel (PSSCH) and second sidelink control information (SCI) may be transmitted, through a physical sidelink control channel (PSCCH), based on the SL resource. For example, the second SCI and a medium access control (MAC) protocol data unit (PDU) may be transmitted through the PSSCH, based on the SL resource.

Additionally or alternatively, the IUC information may be received from the second device via unicast between the first device and the second device.

Additionally or alternatively, sensing may be performed.

Additionally or alternatively, based on a result of the sensing and the IUC information, the SL resource may be selected.

Additionally or alternatively, the information related to whether the capability regarding the IUC is supported may comprise information related to SL resource allocation.

Additionally or alternatively, the SL resource allocation may comprise an SL resource allocation based on an SL resource being determined within a SL resource pool.

Additionally or alternatively, the SL resource allocation may be supported by the second device, and the SL resource may be selected based on the IUC information.

Additionally or alternatively, the SL resource allocation may comprise an SL resource allocation based on the SL resource being provided by the base station.

Additionally or alternatively, the SL resource allocation may be not supported by the second device, and the SL resource may be selected based on the TUC information.

Additionally or alternatively, the IUC request MAC CE may include information that triggers reporting of the IUC information.

Additionally or alternatively, the IUC information may be received from the second device, based on the IUC request MAC CE being transmitted to the second device.

Additionally or alternatively, a transmission resource for the IUC request MAC CE may be selected.

The proposed method may be applied to a device according to various embodiments of the present disclosure. First, one or more memories 204 of the second device 200, based on being executed by the one or more processors 202, may store instructions to cause the second device (e.g., one or more processors 202, one or more transceiver 206) to perform operations. For example, the operations may include: transmitting, to a first device, a radio resource control (RRC) message including information related to whether capability regarding inter-UE coordination (IUC) is supported. For example, the operations may include: receiving, from the first device, an IUC request medium access control (MAC) control element (CE), based on the information related to whether the capability regarding the IUC is supported representing that the capability regarding the IUC is supported. For example, the operations may include: transmitting, to the first device, IUC information including information related to a preferred resource or information related to a non-preferred resource. For example, an SL resource may be selected, based on the IUC information. For example, a first SCI for scheduling of a physical sidelink shared channel (PSSCH) and second sidelink control information (SCI) may be transmitted, through a physical sidelink control channel (PSCCH), based on the SL resource. For example, the second SCI and a medium access control (MAC) protocol data unit (PDU) may be transmitted through the PSSCH, based on the SL resource.

According to an embodiment of the present disclosure, A second device adapted to perform wireless communication may be proposed. For example, the second device may comprise: one or more processors; one or more transceivers; and one or more memories connected to the one or more processors and storing instructions that, based on being executed, cause the one or more processors to perform operations. For example, the operations may include at least one of: transmitting, to a first device, a radio resource control (RRC) message including information related to whether capability regarding inter-UE coordination (IUC) is supported; receiving, from the first device, an IUC request medium access control (MAC) control element (CE), based on the information related to whether the capability regarding the IUC is supported representing that the capability regarding the IUC is supported; and/or transmitting, to the first device, IUC information including information related to a preferred resource or information related to a non-preferred resource. For example, an SL resource may be selected, based on the IUC information. For example, a first SCI for scheduling of a physical sidelink shared channel (PSSCH) and second sidelink control information (SCI) may be transmitted, through a physical sidelink control channel (PSCCH), based on the SL resource. For example, the second SCI and a medium access control (MAC) protocol data unit (PDU) may be transmitted through the PSSCH, based on the SL resource.

According to an embodiment of the present disclosure, a processing device adapted to control a second device may be proposed. For example, the processing device may comprise: one or more processors; and one or more memories connected to the one or more processors and storing instructions that, based on being executed, cause the one or more processors to perform operations. For example, the operations may include at least one of: transmitting, to a first device, a radio resource control (RRC) message including information related to whether capability regarding inter-UE coordination (TUC) is supported; receiving, from the first device, an IUC request medium access control (MAC) control element (CE), based on the information related to whether the capability regarding the IUC is supported representing that the capability regarding the IUC is supported; and/or transmitting, to the first device, TUC information including information related to a preferred resource or information related to a non-preferred resource. For example, an SL resource may be selected, based on the IUC information. For example, a first SCI for scheduling of a physical sidelink shared channel (PSSCH) and second sidelink control information (SCI) may be transmitted, through a physical sidelink control channel (PSCCH), based on the SL resource. For example, the second SCI and a medium access control (MAC) protocol data unit (PDU) may be transmitted through the PSSCH, based on the SL resource.

According to an embodiment of the present disclosure, at least one non-transitory computer-readable storage medium storing instructions may be proposed. For example, the instructions, based on being executed by at least one processor, cause a second device to perform operations. For example, the operations may include at least one of: transmitting, to a first device, a radio resource control (RRC) message including information related to whether capability regarding inter-UE coordination (TUC) is supported; receiving, from the first device, an IUC request medium access control (MAC) control element (CE), based on the information related to whether the capability regarding the IUC is supported representing that the capability regarding the IUC is supported; and/or transmitting, to the first device, IUC information including information related to a preferred resource or information related to a non-preferred resource. For example, an SL resource may be selected, based on the IUC information. For example, a first SCI for scheduling of a physical sidelink shared channel (PSSCH) and second sidelink control information (SCI) may be transmitted, through a physical sidelink control channel (PSCCH), based on the SL resource. For example, the second SCI and a medium access control (MAC) protocol data unit (PDU) may be transmitted through the PSSCH, based on the SL resource.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 13:
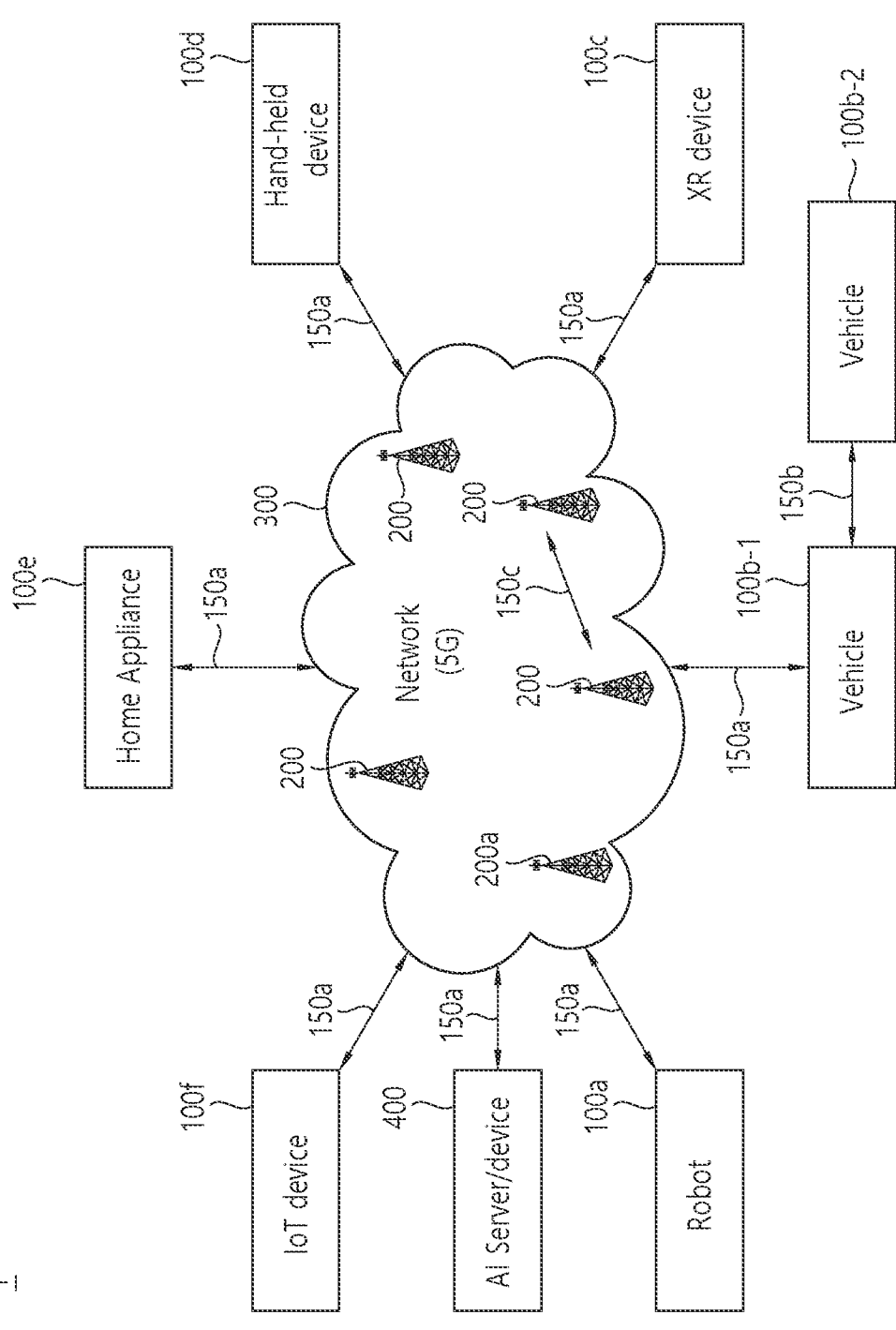
FIG. 13 shows a communication system 1, based on an embodiment of the present disclosure.

FIG. 13 shows a communication system 1, based on an embodiment of the present disclosure. The embodiment of FIG. 13 may be combined with various embodiments of the present disclosure.

Referring to FIG. 13, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Here, wireless communication technology implemented in wireless devices 100*a* to 100*f* of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100*a* to 100*f* of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100*a* to 100*f* of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 14:
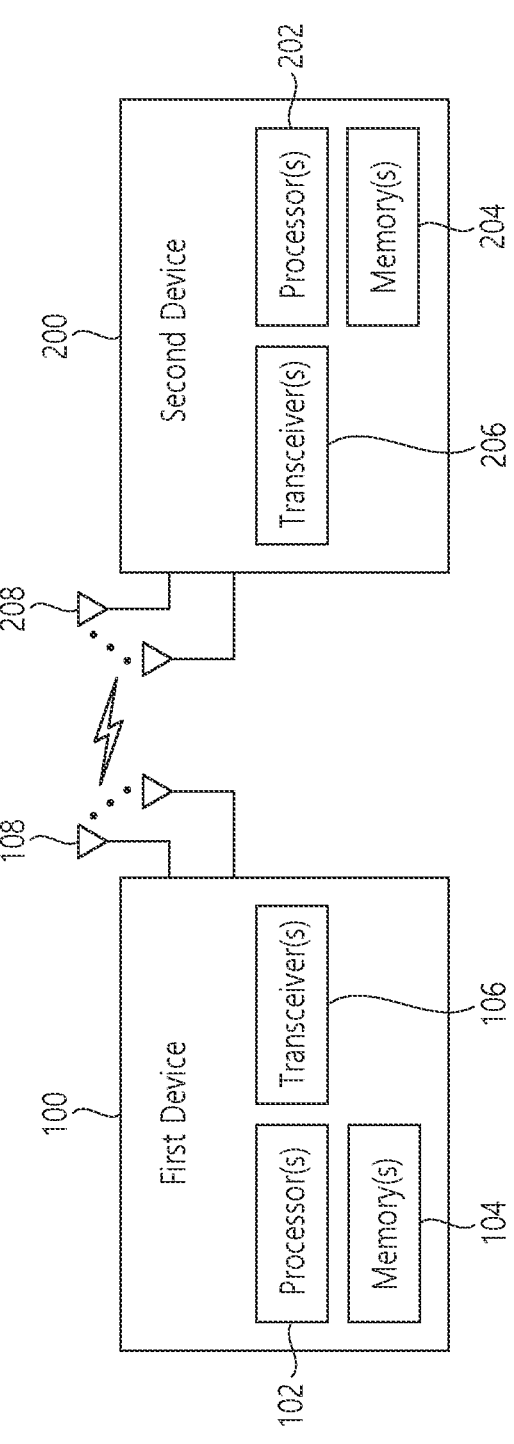
FIG. 14 shows wireless devices, based on an embodiment of the present disclosure.

FIG. 14 shows wireless devices, based on an embodiment of the present disclosure. The embodiment of FIG. 14 may be combined with various embodiments of the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document.

Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 15:
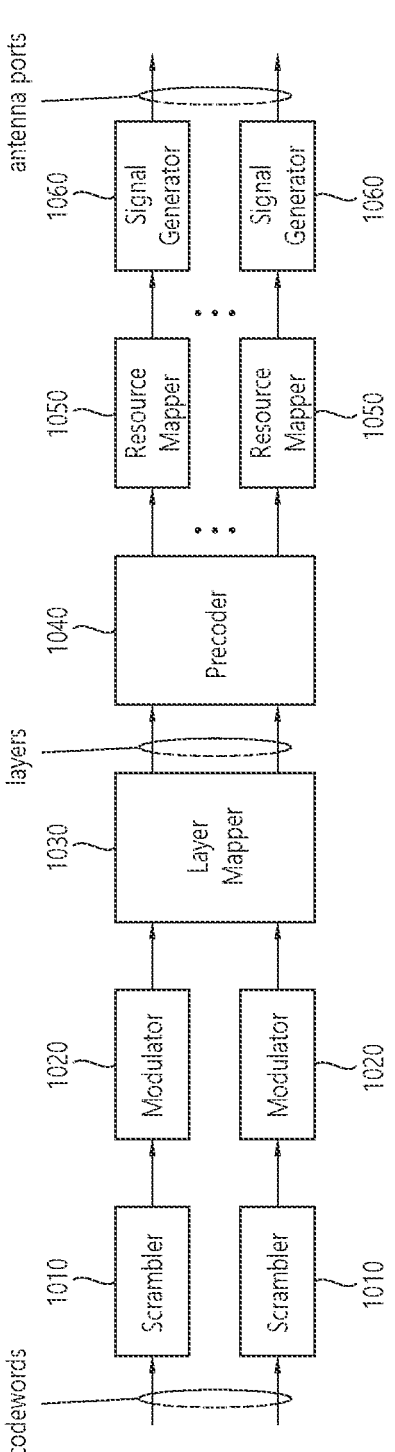
FIG. 15 shows a signal process circuit for a transmission signal, based on an embodiment of the present disclosure.

FIG. 15 shows a signal process circuit for a transmission signal, based on an embodiment of the present disclosure. The embodiment of FIG. 15 may be combined with various embodiments of the present disclosure.

Referring to FIG. 15, a signal processing circuit 1000 may include scramblers 1010, modulators 1020, a layer mapper 1030, a precoder 1040, resource mappers 1050, and signal generators 1060. An operation/function of FIG. 15 may be performed, without being limited to, the processors 102 and 202 and/or the transceivers 106 and 206 of FIG. 14. Hardware elements of FIG. 15 may be implemented by the processors 102 and 202 and/or the transceivers 106 and 206 of FIG. 14. For example, blocks 1010 to 1060 may be implemented by the processors 102 and 202 of FIG. 14. Alternatively, the blocks 1010 to 1050 may be implemented by the processors 102 and 202 of FIG. 14 and the block 1060 may be implemented by the transceivers 106 and 206 of FIG. 14.

Codewords may be converted into radio signals via the signal processing circuit 1000 of FIG. 15. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 15. For example, the wireless devices (e.g., 100 and 200 of FIG. 14) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 16:
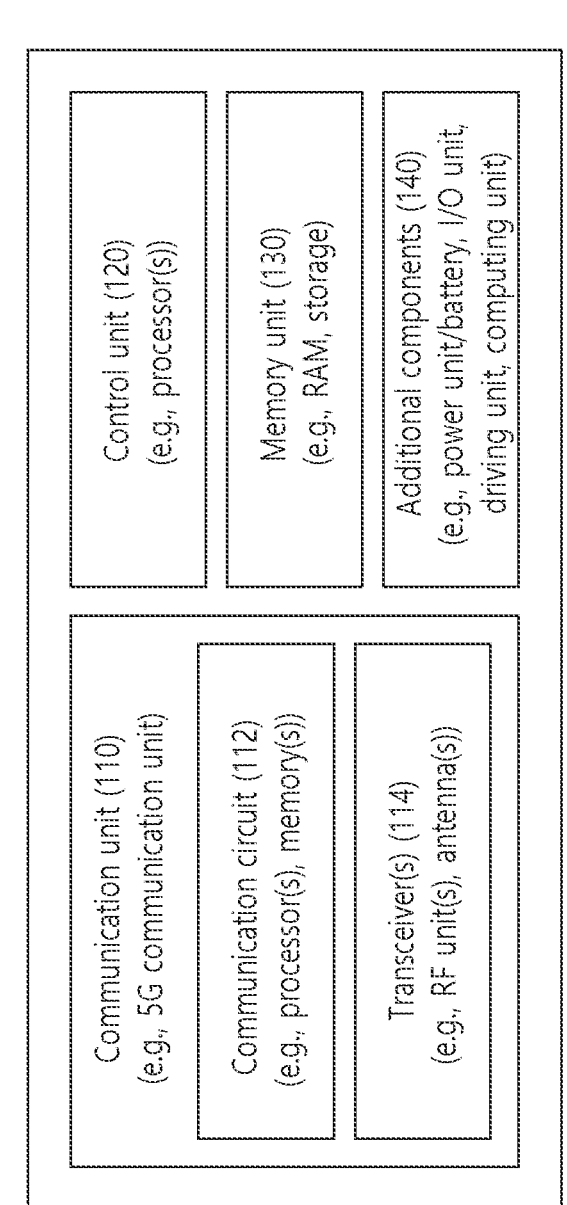
FIG. 16 shows another example of a wireless device, based on an embodiment of the present disclosure.

FIG. 16 shows another example of a wireless device, based on an embodiment of the present disclosure. The wireless device may be implemented in various forms according to a use-case/service (refer to FIG. 13). The embodiment of FIG. 16 may be combined with various embodiments of the present disclosure.

Referring to FIG. 16, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 13), the vehicles (100b-1 and 100b-2 of FIG.

13), the XR device (100c of FIG. 13), the hand-held device (100d of FIG. 13), the home appliance (100e of FIG. 13), the IoT device (100f of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 16, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 16 will be described in detail with reference to the drawings.

Figure 17:
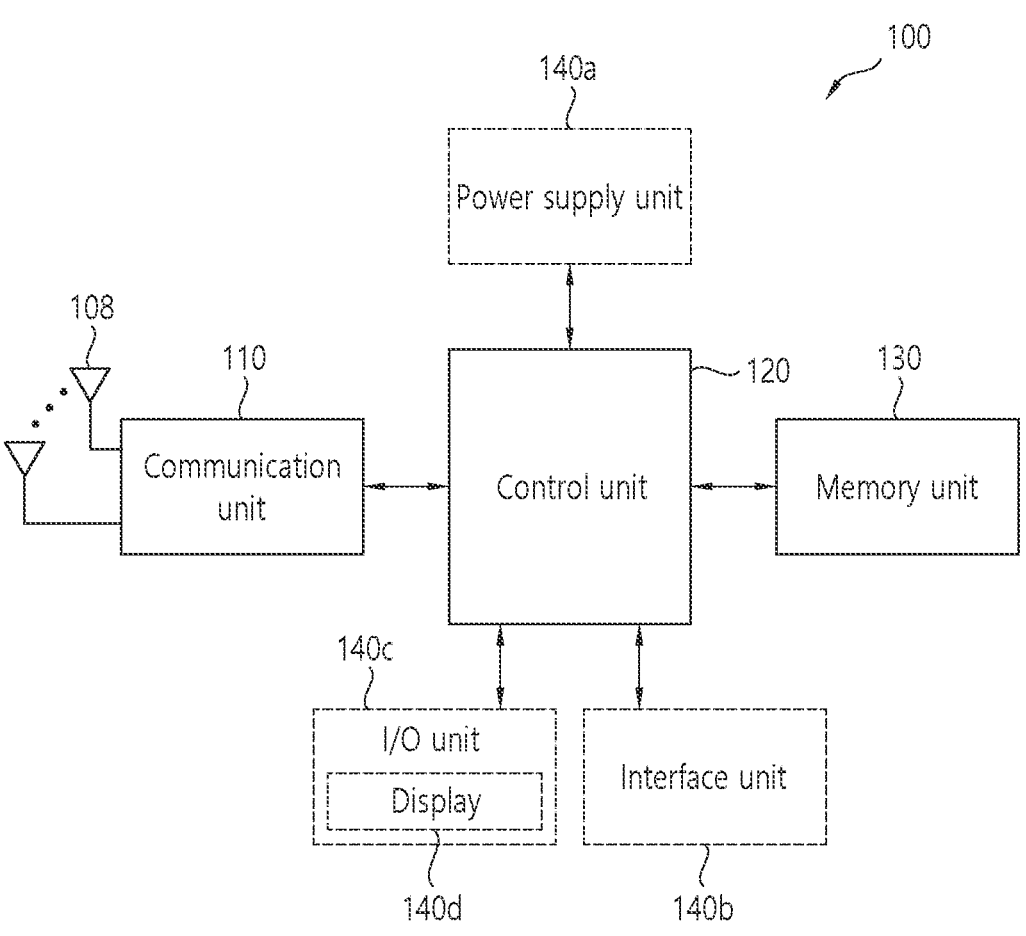
FIG. 17 shows a hand-held device, based on an embodiment of the present disclosure.

FIG. 17 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 17 may be combined with various embodiments of the present disclosure.

Referring to FIG. 17, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 16, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 18 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 18 may be combined with various embodiments of the present disclosure.

Referring to FIG. 18, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 16, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
receiving, from a second device, a radio resource control (RRC) message including information related to whether capability regarding inter-UE coordination (IUC) is supported;
transmitting, to the second device, an IUC request medium access control (MAC) control element (CE), based on the information related to whether the capability regarding the IUC is supported representing that the capability regarding the IUC is supported;
receiving, from the second device, IUC information including information related to a preferred resource or information related to a non-preferred resource;
selecting an SL resource, based on the IUC information;
transmitting a first SCI for scheduling of a physical sidelink shared channel (PSSCH) and second sidelink control information (SCI), through a physical sidelink control channel (PSCCH), based on the SL resource; and
transmitting the second SCI and a medium access control (MAC) protocol data unit (PDU) through the PSSCH, based on the SL resource.

2. The method of claim 1, wherein the IUC information is transmitted via the IUC coordination information MAC CE.

3. The method of claim 1, wherein transmission of the IUC request MAC CE is omitted, based on the information related to whether the capability regarding the IUC is supported representing that the capability regarding the IUC is not supported.

4. The method of claim 1, wherein the IUC information is received from the second device via unicast between the first device and the second device.

5. The method of claim 1, further comprising:
performing sensing; and
and wherein, based on a result of the sensing and the IUC information, the SL resource is selected.

6. The method of claim 1, wherein the information related to whether the capability regarding the IUC is supported comprises information related to SL resource allocation.

7. The method of claim 6, wherein the SL resource allocation comprises an SL resource allocation based on an SL resource being determined within a SL resource pool.

8. The method of claim 7, wherein the SL resource allocation is supported by the second device, and
wherein the SL resource is selected based on the IUC information.

9. The method of claim 7, wherein the SL resource allocation is not supported by the second device, and
wherein the SL resource is selected based on the IUC information.

10. The method of claim 6, wherein the SL resource allocation comprises an SL resource allocation based on the SL resource being provided by the base station.

11. The method of claim 1, wherein the IUC request MAC CE includes information that triggers reporting of the IUC information.

12. The method of claim 1, wherein the IUC information is received from the second device, based on the IUC request MAC CE being transmitted to the second device.

13. The method of claim 1, further comprising: selecting a transmission resource for the IUC request MAC CE.

14. A first device adapted to perform wireless communication, the first device comprising:
one or more processors;
one or more transceivers; and
one or more memories connected to the one or more processors and storing instructions that, based on being executed, cause the one or more processors to perform operations comprising:
receiving, from a second device, a radio resource control (RRC) message including information related to whether capability regarding inter-UE coordination (IUC) is supported;
transmitting, to the second device, an IUC request medium access control (MAC) control element (CE), based on the information related to whether the capability regarding the IUC is supported representing that the capability regarding the IUC is supported;
receiving, from the second device, IUC information including information related to a preferred resource or information related to a non-preferred resource;
selecting an SL resource, based on the IUC information;
transmitting a first SCI for scheduling of a physical sidelink shared channel (PSSCH) and second sidelink control information (SCI), through a physical sidelink control channel (PSCCH), based on the SL resource; and
transmitting the second SCI and a medium access control (MAC) protocol data unit (PDU) through the PSSCH, based on the SL resource.

15. A processing device adapted to control a first device, the processing device comprising:
one or more processors; and
one or more memories operably connectable to the one or more processors and storing instructions that, based on being executed, cause the one or more processors to perform operations comprising:
receiving, from a second device, a radio resource control (RRC) message including information related to whether capability regarding inter-UE coordination (IUC) is supported;

transmitting, to the second device, an IUC request medium access control (MAC) control element (CE), based on the information related to whether the capability regarding the IUC is supported representing that the capability regarding the IUC is supported;

receiving, from the second device, IUC information including information related to a preferred resource or information related to a non-preferred resource;

selecting an SL resource, based on the IUC information;

transmitting a first SCI for scheduling of a physical sidelink shared channel (PSSCH) and second sidelink control information (SCI), through a physical sidelink control channel (PSCCH), based on the SL resource; and transmitting the second SCI and a medium access control (MAC) protocol data unit (PDU) through the PSSCH, based on the SL resource.

16. The processing device of claim 15, wherein the IUC information is transmitted via the IUC information MAC CE.

17. The processing device of claim 15, wherein transmission of the IUC request MAC CE is omitted, based on the information related to whether the capability regarding the IUC is supported representing that the capability regarding the IUC is not supported.

18. The processing device of claim 15, wherein the IUC information is received from the second device via unicast between the first device and the second device.

19. The processing device of claim 15, wherein the operations further comprise:

performing sensing; and and wherein, based on a result of the sensing and the IUC information, the SL resource is selected.

20. The processing device of claim 15, wherein the information related to whether the capability regarding the IUC is supported comprises information related to SL resource allocation.

\* \* \* \* \*